(12) United States Patent
Belinda et al.

(10) Patent No.: US 9,216,847 B2
(45) Date of Patent: Dec. 22, 2015

(54) CONTAINER AND LID WITH FASTENER ALIGNMENT GUIDE

(71) Applicant: Handy & Harman, White Plains, NY (US)

(72) Inventors: Richard L. Belinda, Westfield, MA (US); Timothy F. Gillis, Florence, MA (US); Mark Joseph Guthrie, West Springfield, MA (US)

(73) Assignee: Handy & Harman, White Plains, NY (US)

( * ) Notice: Subject to any disclaimer, the term of this patent is extended or adjusted under 35 U.S.C. 154(b) by 10 days.

(21) Appl. No.: 13/892,596

(22) Filed: May 13, 2013

(65) Prior Publication Data
US 2013/0306633 A1 Nov. 21, 2013

Related U.S. Application Data

(60) Provisional application No. 61/647,734, filed on May 16, 2012, provisional application No. 61/697,429, filed on Sep. 6, 2012.

(51) Int. Cl.
| | |
|---|---|
| *B65D 51/24* | (2006.01) |
| *E04F 21/20* | (2006.01) |
| *B23B 47/28* | (2006.01) |
| *B25B 23/08* | (2006.01) |
| *B25H 7/00* | (2006.01) |
| *G01B 3/00* | (2006.01) |
| *B25H 7/04* | (2006.01) |

(52) U.S. Cl.
CPC ............... *B65D 51/24* (2013.01); *B23B 47/28* (2013.01); *B23B 47/287* (2013.01); *B25B 23/08* (2013.01); *B25H 7/00* (2013.01); *B25H 7/04* (2013.01); *E04F 21/20* (2013.01); *G01B 3/00* (2013.01)

(58) Field of Classification Search
CPC .... B23B 47/28; B23B 47/287; B23B 47/284; B23B 49/02; B25B 23/08; E04G 21/1891; E04F 21/20; B25H 7/00; B25H 7/04; B65D 51/24; G01B 3/00
USPC .............. 220/212, 784, 787, 799, 800, 367.1; 269/289 R, 900, 43, 71, 271; 52/749.1, 52/DIG. 1; 33/526, 527, 630, 638, 562, 33/563, 566, 1 F; 408/115 R, 115 B
See application file for complete search history.

(56) References Cited

U.S. PATENT DOCUMENTS 4,145,160 A * 3/1979 Wiggins .................. 408/103
4,421,442 A * 12/1983 Lindblad .................. 408/115 R
(Continued)

*Primary Examiner* — Anthony Stashick
*Assistant Examiner* — James N Smalley
(74) *Attorney, Agent, or Firm* — Alix, Yale & Ristas, LLP

(57) ABSTRACT

A fastener storage assembly comprises a container and a lid. The container has a bottom and two pairs of opposed sidewalls. The lid acts as a fastener alignment guide for locating a fastener to be driven through a deck board having a width w into a joist having an engagement edge face thickness t. The fastener alignment guide has a template and a pair of aligned substantially identical wings equidistantly spaced a distance w. The template defines a pair of aligned openings each having a center and a medial axis passing through each center. Each of the wings projects perpendicular to the template and defines a recess defined by a pair of parallel edges spaced a distance t. A plane through the medial axis and perpendicular to the template is equidistantly spaced the edges.

21 Claims, 38 Drawing Sheets

(56) References Cited

U.S. PATENT DOCUMENTS

| | | | | |
|---|---|---|---|---|
| 4,752,162 | A | * | 6/1988 | Groh .................... 408/115 R |
| 4,930,225 | A | * | 6/1990 | Phillips ...................... 33/526 |
| 5,384,103 | A | * | 1/1995 | Miller ....................... 422/310 |
| 5,407,306 | A | * | 4/1995 | Klapperich ............ 408/115 R |
| 2007/0175176 | A1 | * | 8/2007 | Lane ......................... 52/749.1 |
| 2011/0147381 | A1 | * | 6/2011 | Stone ......................... 220/212 |
| 2011/0214389 | A1 | * | 9/2011 | Paton ........................ 52/749.1 |
| 2013/0174498 | A1 | * | 7/2013 | Hovren ......................... 52/105 |
| 2014/0217095 | A1 | * | 8/2014 | Scivoletto ................. 220/212 |

\* cited by examiner

CONTAINER AND LID WITH FASTENER ALIGNMENT GUIDE

BACKGROUND

This disclosure relates generally to methods and tools for installing deck boards and/or balusters. More particularly, this disclosure relates to tools and methods for obtaining the proper alignment and fastener locations during the installation of deck boards and/or balusters.

Numerous new products, tools and hardware have been introduced to facilitate the construction of decks including the securement of deck boards. The installation of deck boards is a labor-intensive activity which requires careful attention to alignment and spacing and proper securement of the deck board. Typically, the face mounted deck board is mounted over several spaced joists. One or more fasteners are driven into the deck board and threadably secured into each joist. Proper alignment of the deck board and proper placement of the fasteners is key to a finished deck which is structurally sound and aesthetically pleasing. The proper hardware and associated tools are invaluable in ensuring that the deck boards are installed in a highly efficient process.

Likewise, for the construction of balustrades, the proper spacing of balusters and location of fasteners in an efficient manner is highly desirable.

SUMMARY

Briefly stated, a fastener storage assembly of the current disclosure comprises a container and a lid. The container has a bottom and first and second opposed pairs of sidewalls. The sidewalls extend perpendicularly from the bottom. The lid comprises a fastener alignment guide. The fastener alignment guide is configured for locating a fastener to be driven through a deck board having a width w into a joist having an engagement edge face thickness t.

In one embodiment the fastener alignment guide comprises a template which defines a pair of aligned openings each having a center and a medial axis passing through each center. A pair of aligned substantially identical wings project perpendicular to the template. The wings are equidistantly spaced a distance w, and each wing defines a recess. The recess is further defined by a pair of parallel edges spaced a distance t, and configured such that a plane through the medial axis and perpendicular to the template is equidistantly spaced from the parallel edges.

In another embodiment, the template additionally has a central medial axis and defines a plurality of pairs of laterally opposed openings. Each opening has a center, and each opening is defined at a point equidistant from the central medial axis. Each pair of laterally opposed openings lies on a separate lateral axis, and each lateral axis is oriented perpendicular to the central medial axis. Each lateral axis passes through the centers of the corresponding pair of laterally opposed openings.

The lateral axes and pairs of laterally opposed openings are positioned on the template such that any opening on one lateral axis is aligned at an angle θ with respect to an opening on an opposite side of the central median axis and lying on a separate lateral axis. The angle 9 is measured with respect to the lateral axes.

In another embodiment, the first and second sidewalls of the container terminate axially opposite the bottom in a peripheral container lip. In this embodiment, a sleeve projects peripherally from an exterior surface of each of the first pair of opposed sidewalls. Each of the sleeves has a peripheral wall and a pair of lateral terminal walls.

The lid for this embodiment of the fastener storage assembly is configured to cooperate with the lateral terminal walls. The lid has a peripheral lid engagement lip, which defines a plurality of notches. The notches are configured to cooperate with the lateral terminal walls of the sleeve such that the peripheral lid engagement lip is received in the sleeve, reversibly mating the peripheral lid engagement lip with the peripheral container lip.

BRIEF DESCRIPTION OF THE DRAWINGS

Aspects of the preferred embodiment will be described in reference to the Drawing, where like numerals reflect like elements.

DETAILED DESCRIPTION

Figure 1:
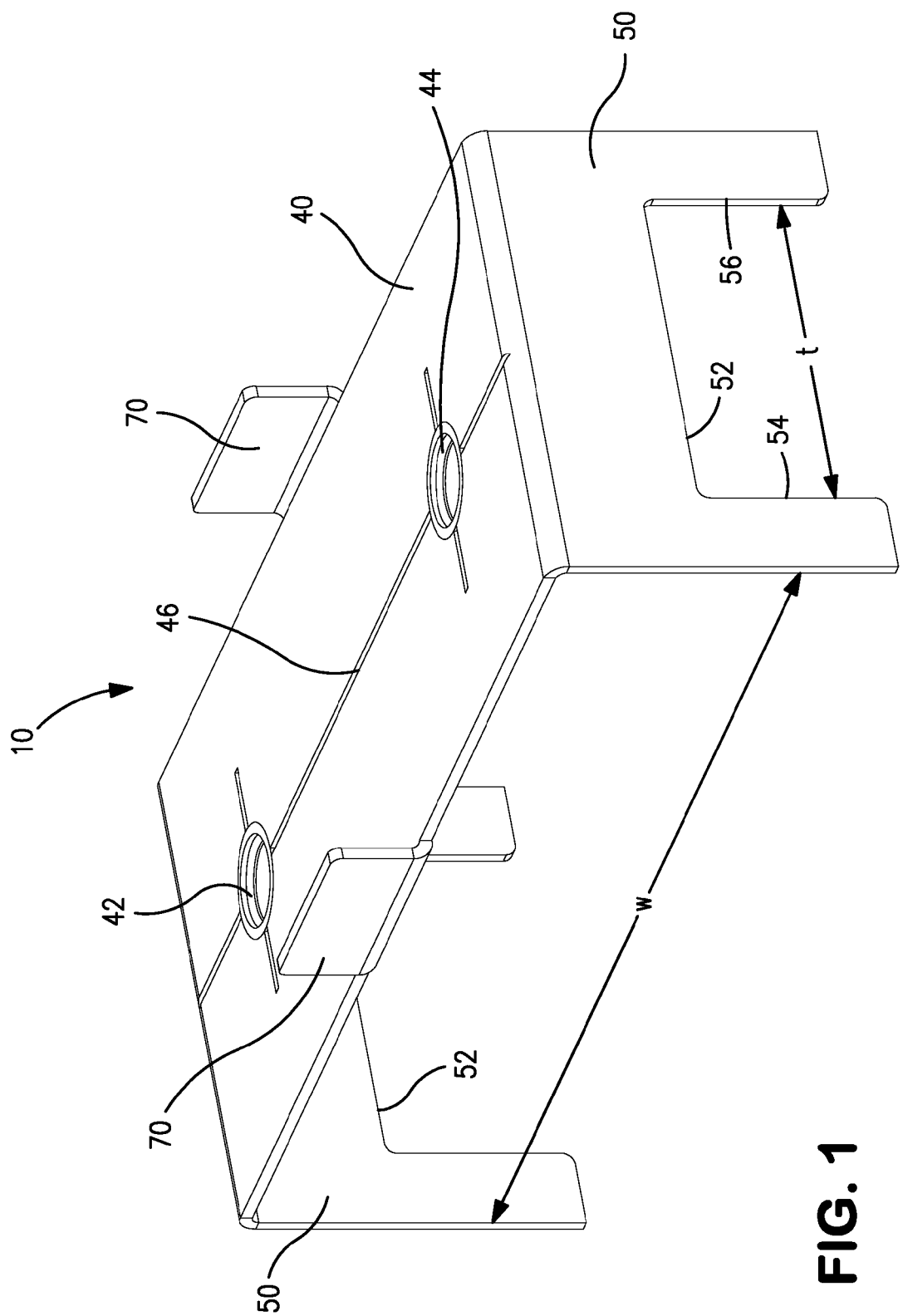
FIG. 1 is a perspective view, partly diagrammatic, of a fastener alignment guide for a face mounted deck board.

With reference to the drawings wherein like numerals represent like parts throughout the several figures, a fastener alignment guide is generally designated by the numeral 10. The fastener alignment guide 10 is particularly adapted to provide the proper placement for driving a fastener for securing a deck board to an underlying joist for a deck installation.

In the illustrated environment of FIGS. 2 through 5, a representative joist 20 is illustrated in conjunction with a pair of deck boards 24 and 26. A representative joist 20 has an engagement edge 22 face thickness t which is generally uniform. Naturally, numerous spaced parallel joists (not illustrated) are employed. The deck boards 24, 26 preferably have a uniform width w and uniform thickness with slightly beveled edges.

The fastener alignment guide 10 easily and efficiently mounts over the face of the deck board 24, 26 to be installed and seats on the joist 20 in saddle fashion. The guide 10 provides the proper alignment for driving fasteners 30 each having a threaded shank 32 and a head 34 to secure the deck board to the joist. Preferred fasteners comprise the TrapEase® III and Trio™ deck screws manufactured and marketed by OMG, Inc. of Agawam, Mass. The alignment guide 10 provides an optimum placement for the fasteners 30 (on the longitudinal midline of the joist) so that the proper alignment with the joist 20 is accomplished in a highly efficient and precise process.

The fastener alignment guide 10, which may be formed from metal or suitable plastic composition, includes a generally rectangular template 40. The template 40 has a pair of openings 42 and 44 which align along a central medial axis 46 through the template. The openings 42, 44 are preferably equidistantly spaced from the opposed ends as well as equidistantly spaced from the opposed sides. Other numbers of openings are possible.

Two opposed, substantially identical wings 50 extend generally perpendicular to the template 40. The wings 50 preferably have a generally rectangular recess 52 defined by a pair of parallel edges 54 and 56 which are spaced a distance equal to the thickness t of the joist 20. The wings 50 are generally parallel and are spaced a distance w equal to the width of the deck board. It will be appreciated that a plane through the medial axis 46 of the template and perpendicular to the openings 42, 44 also passes at the midpoint between the edges 54, 56. A pair of upwardly projecting grips, which may assume the form of a pair of tabs 70, facilitates manual manipulation of the guide.

Figure 3:
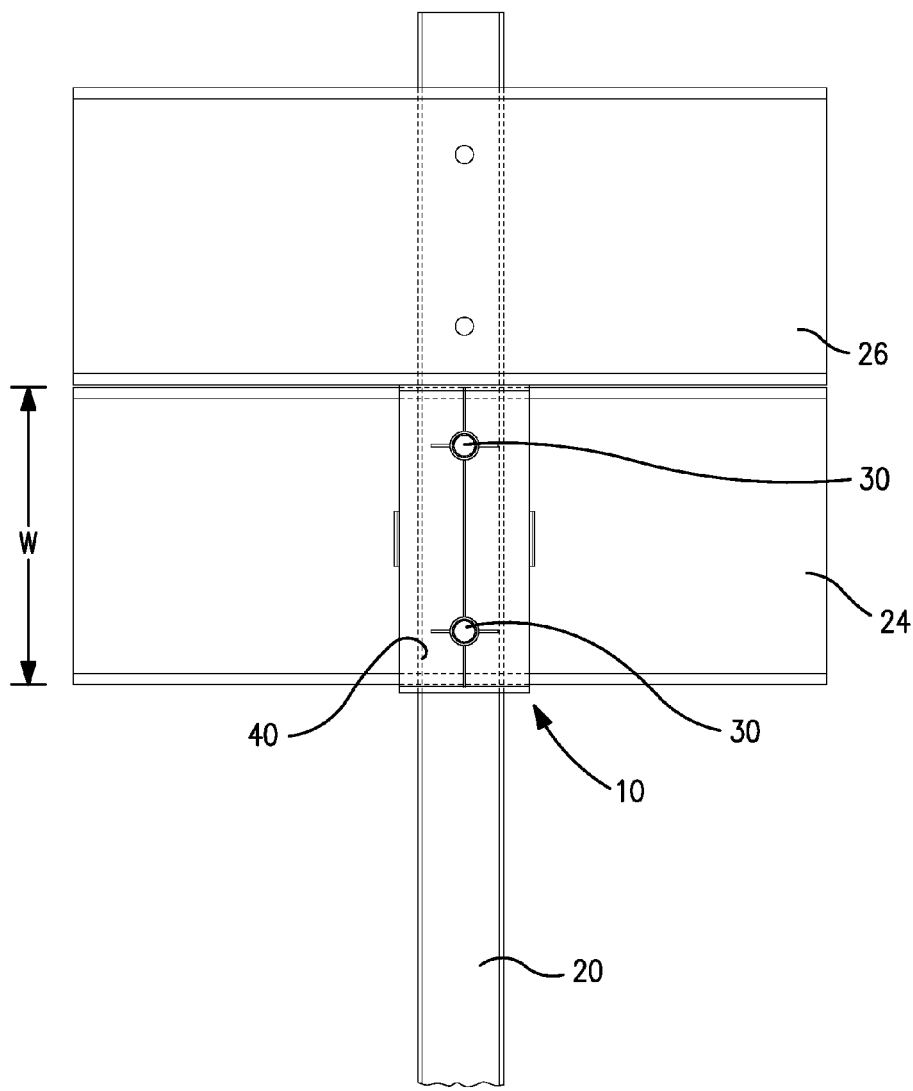
FIG. 3 is a top plan view of the deck board, joist, fasteners and fastener alignment guide of FIG. 2 as positioned for fastening a deck board.
Figure 4:
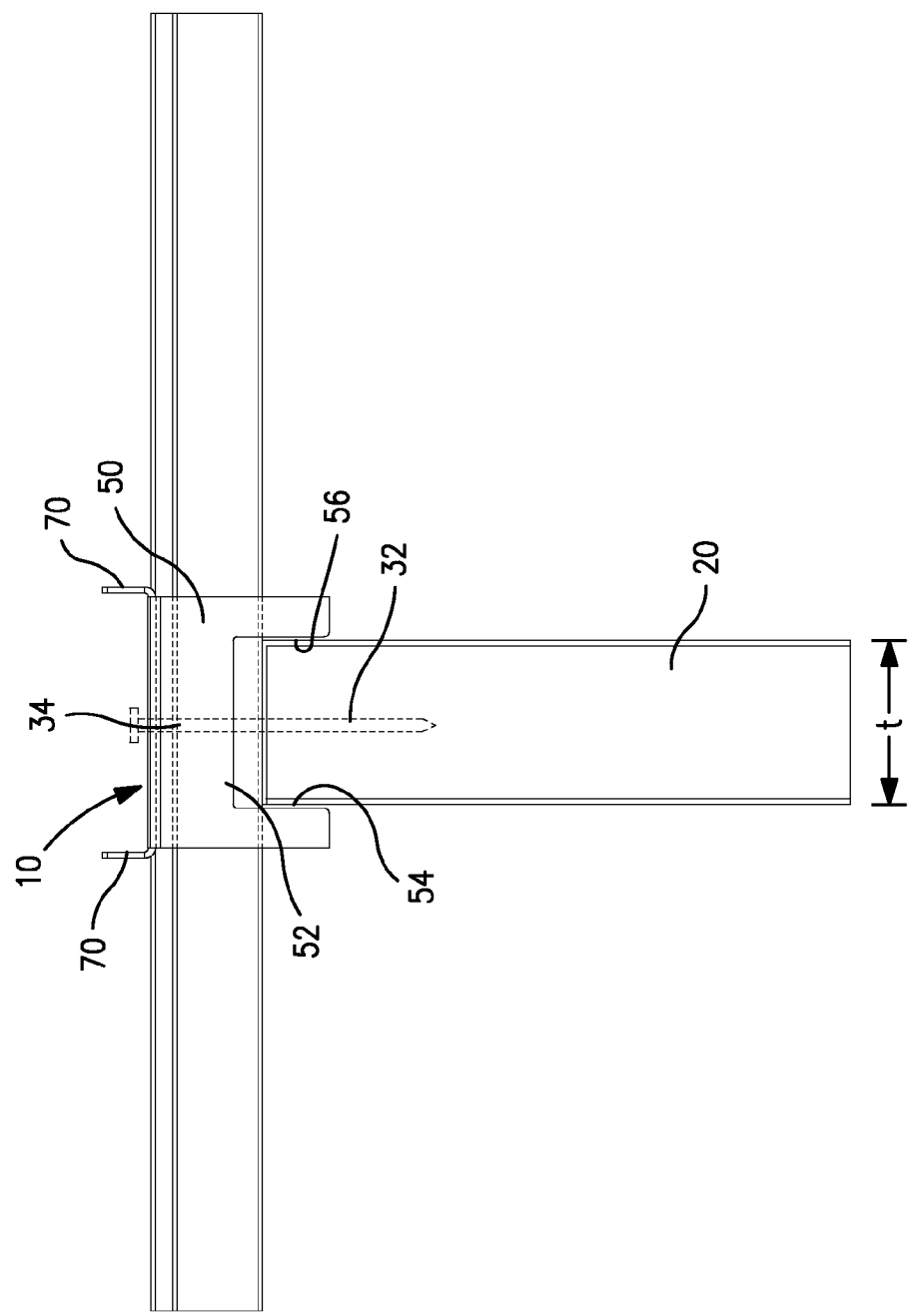
FIG. 4 is an end view, partly diagrammatic, of the joist, deck board and fastener alignment guide of FIG. 3 with fasteners shown in phantom.
Figure 5:
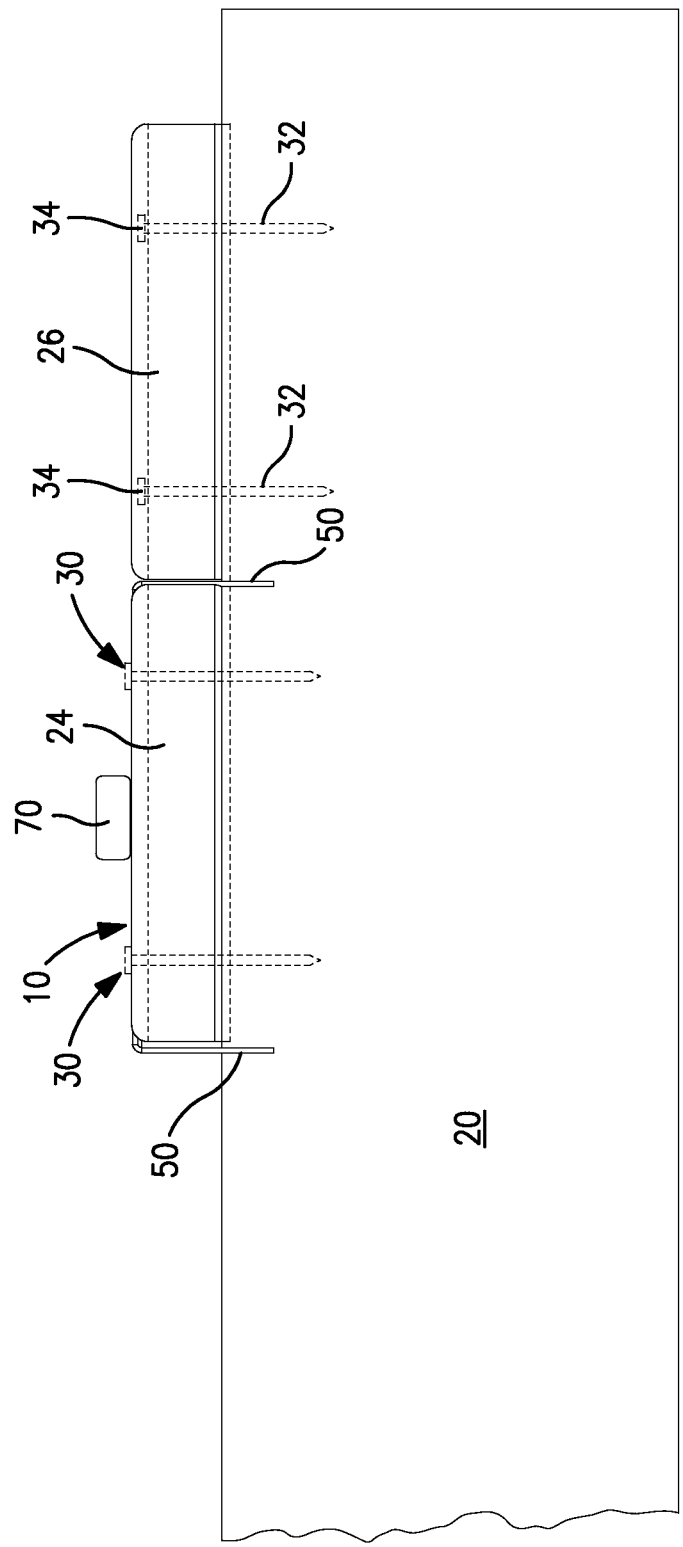
FIG. 5 is a side view of the deck board, joist and fastener alignment guide of FIG. 2 with fasteners shown in phantom.
Figure 6:
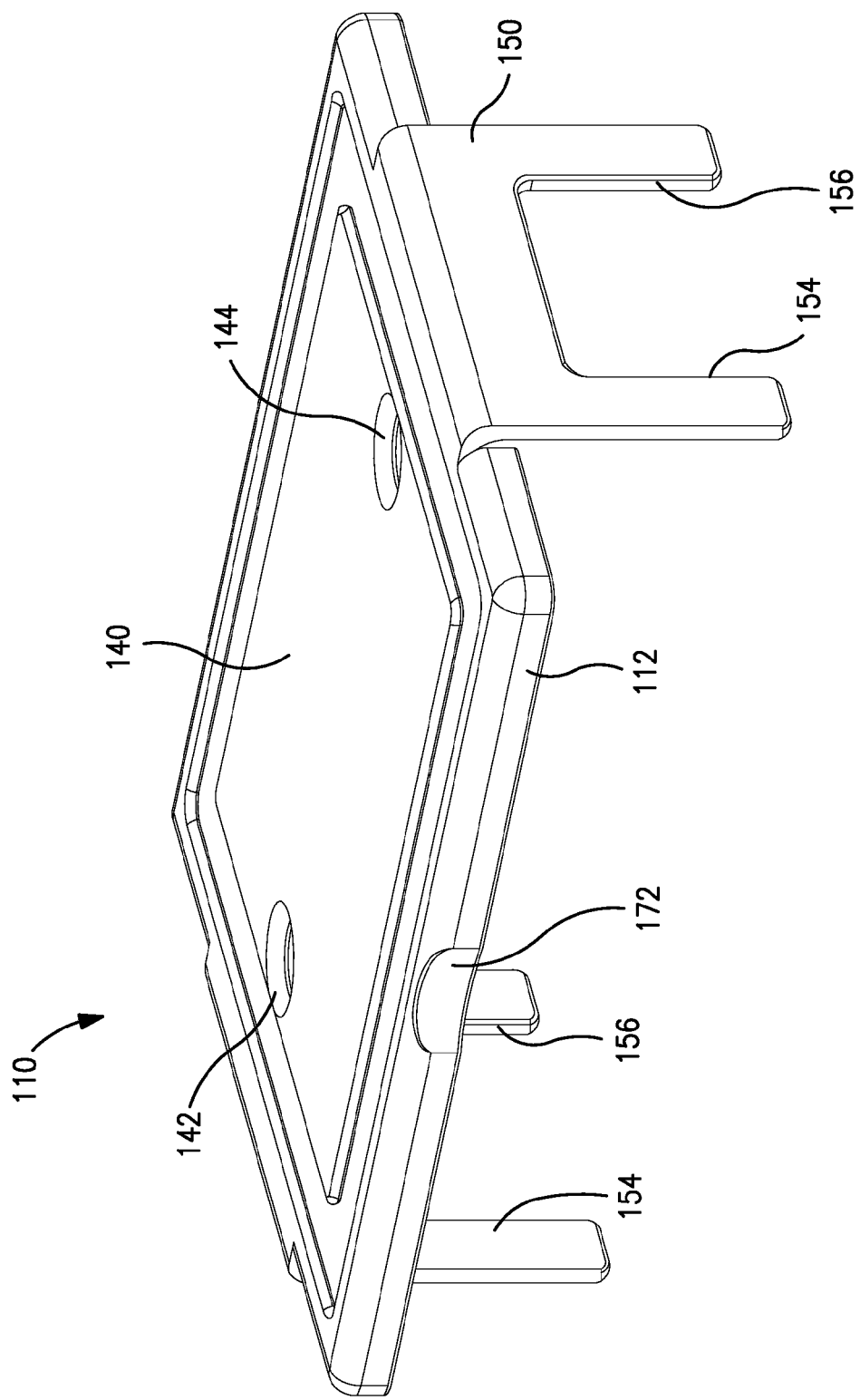
FIG. 6 is a perspective view of a second embodiment of a fastener alignment guide.
Figure 7:
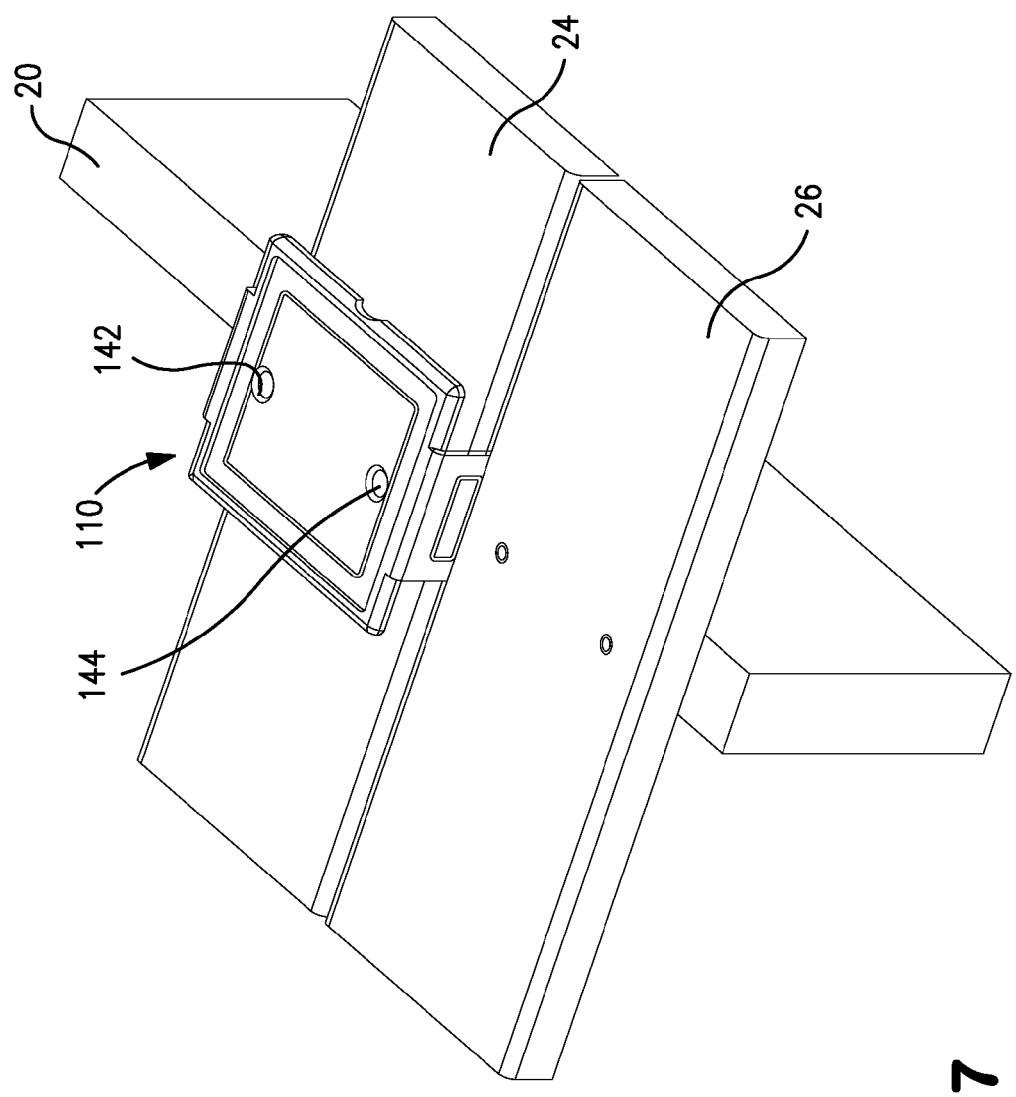
FIG. 7 is a perspective view of the deck board as secured to a joist by usage of the fastener alignment guide and further illustrating a pre-installation configuration of the fastener alignment guide of FIG. 6.
Figure 8:
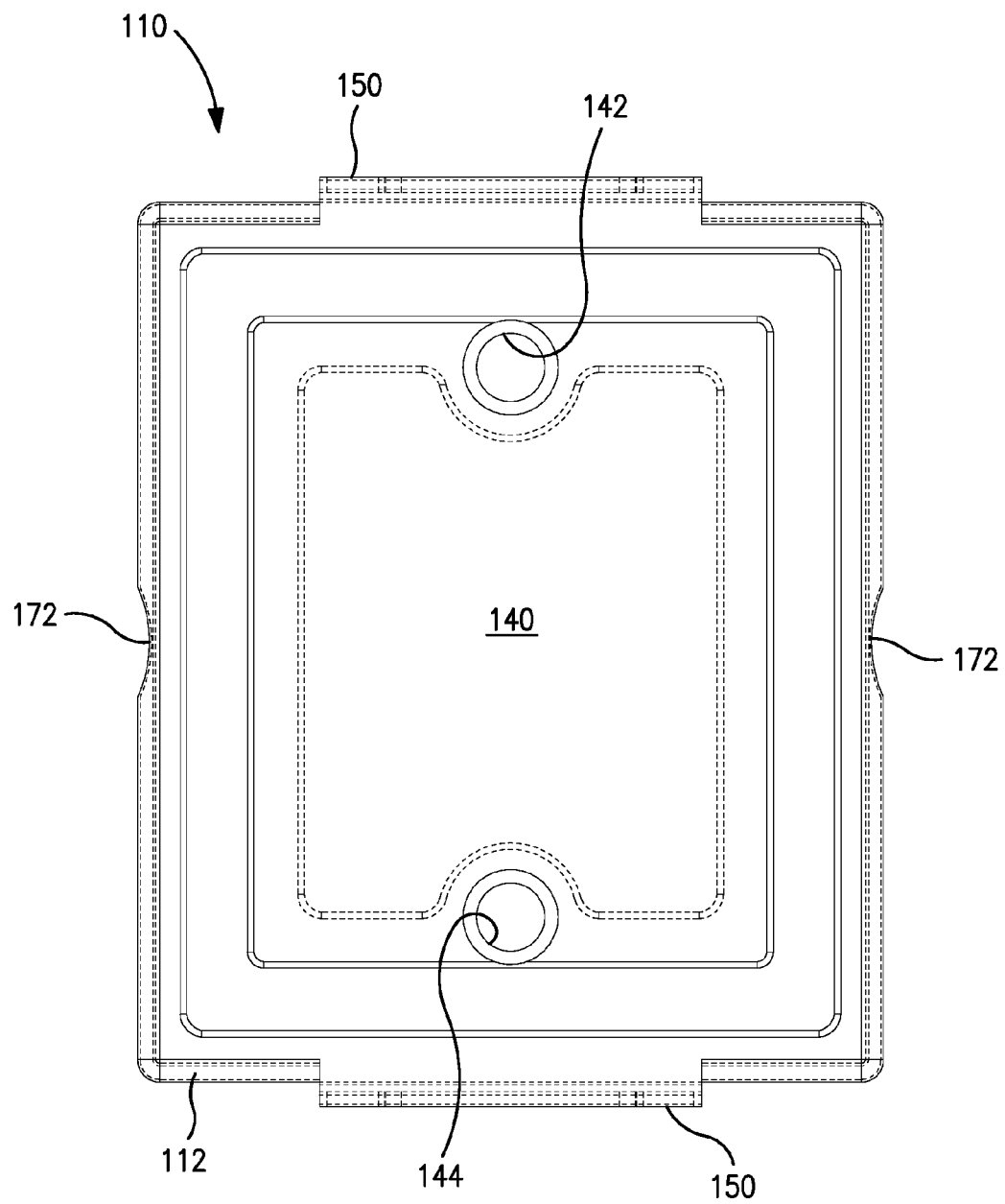
FIG. 8 is a top plan view, partly in phantom, of the fastener alignment guide of FIG. 6.
Figure 9:
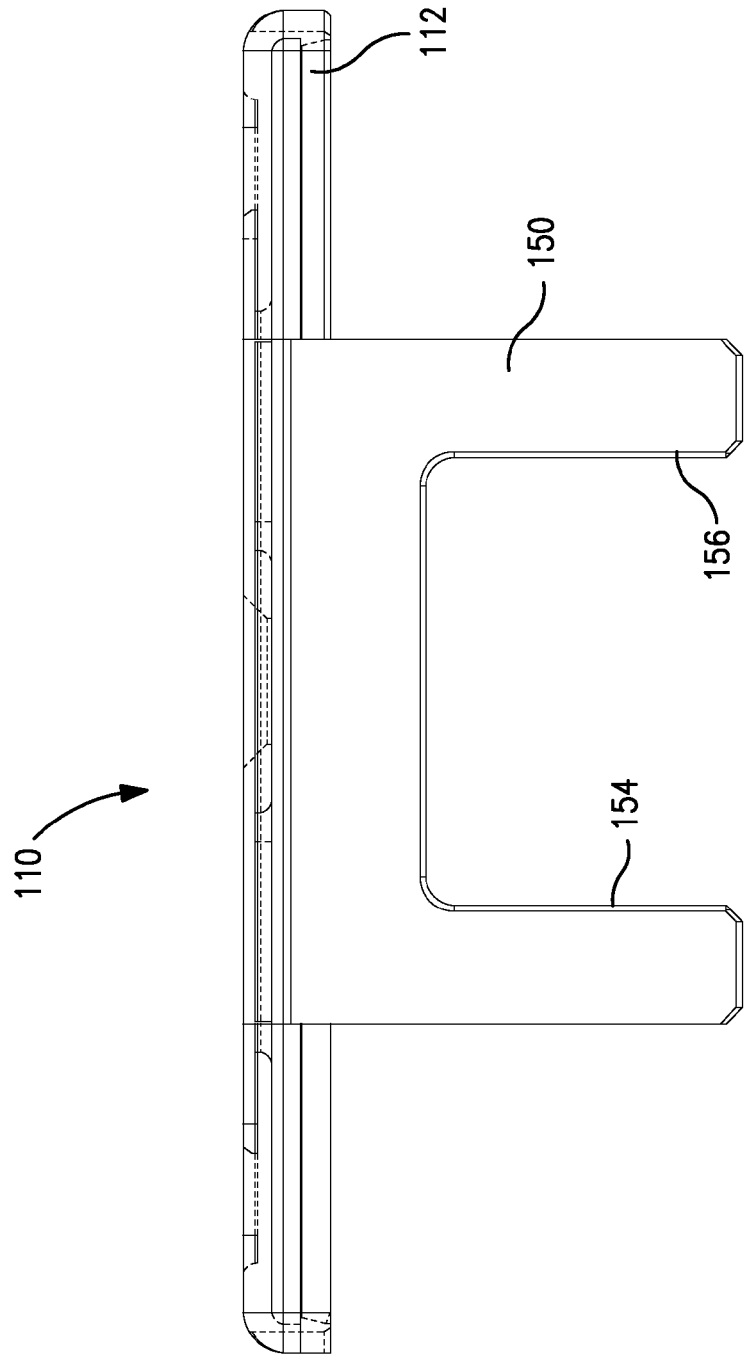
FIG. 9 is an end view, partly in phantom, of the fastener alignment guide of FIG. 6.
Figure 10:
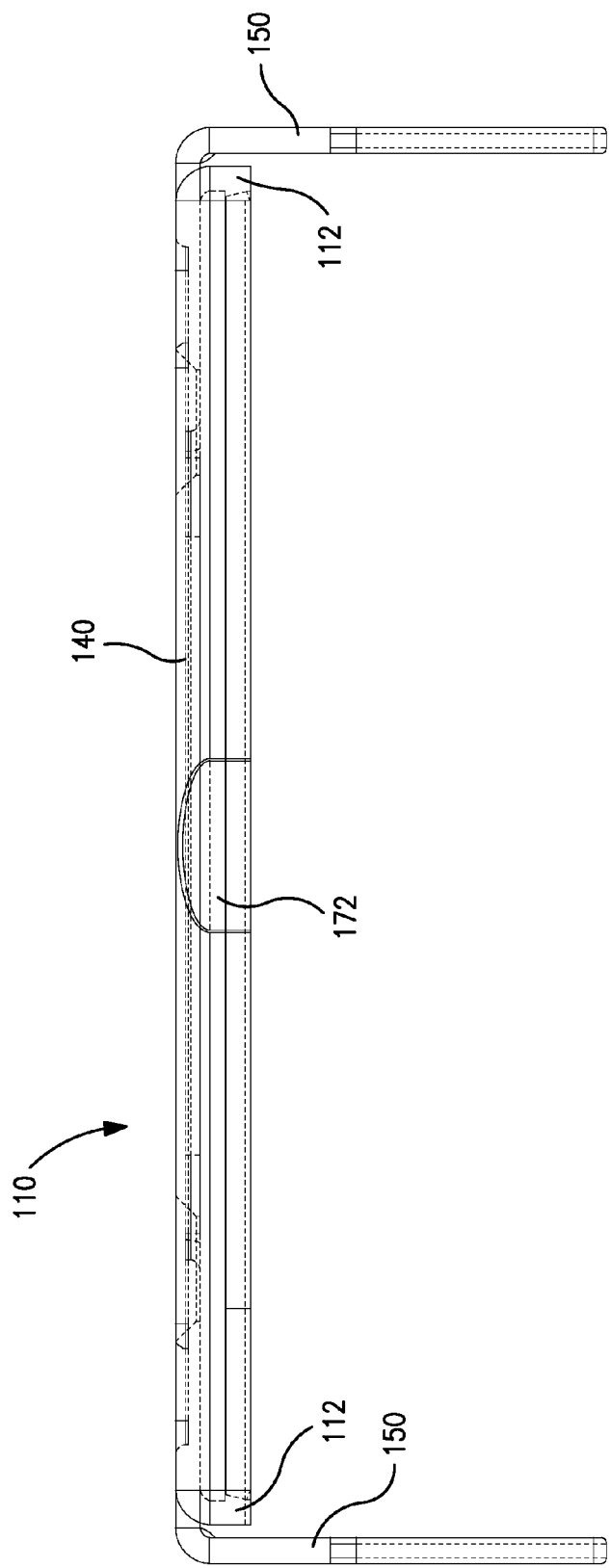
FIG. 10 is a side view, partly in phantom, of the fastener alignment guide of FIG. 6.
Figure 11:
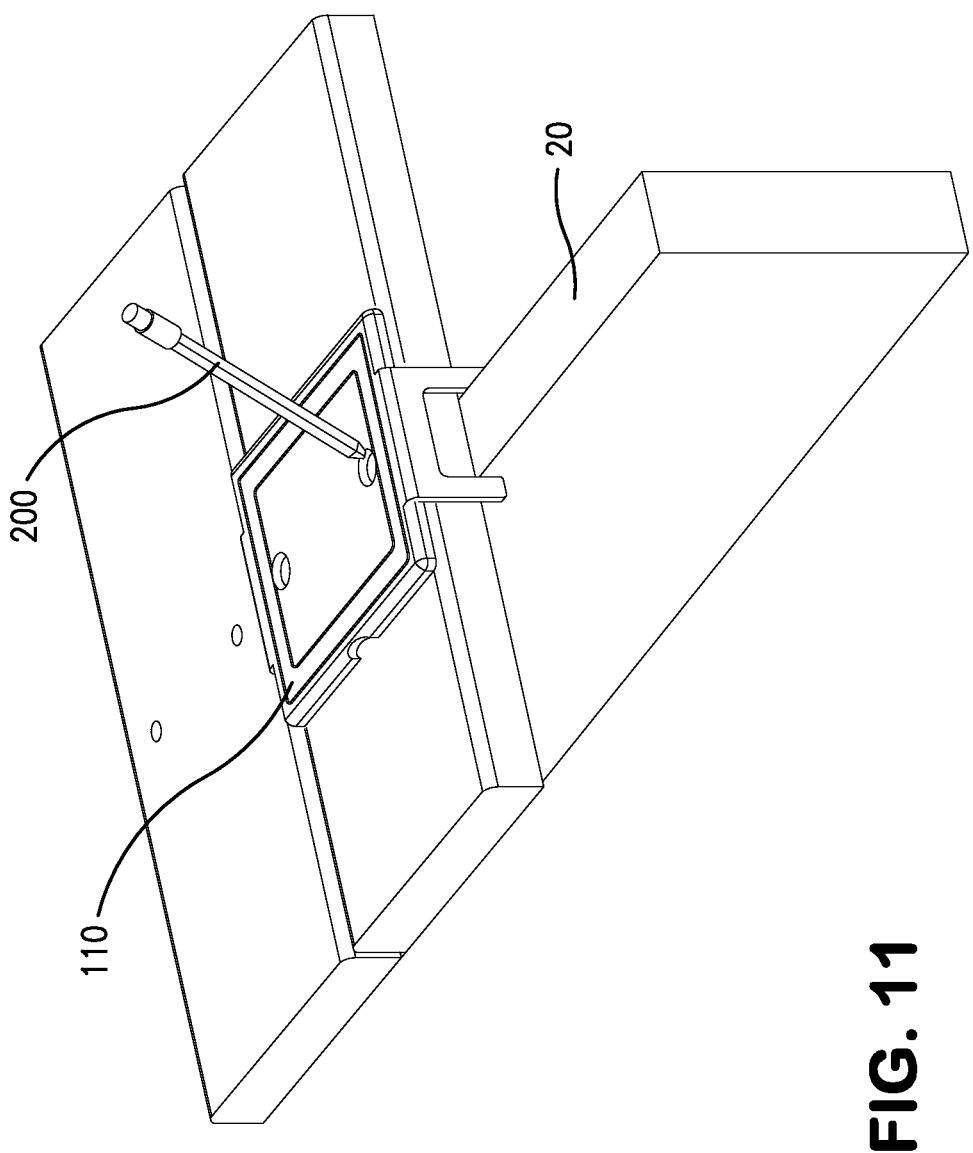
FIG. 11 is a perspective view of a joist and a pair of deck boards and a representative pencil illustrating how the fastener alignment guide may be employed to mark the proper placement of a fastener and further illustrating a pair of fasteners securing another deck board to a joist after usage of the alignment guide.
Figure 12:
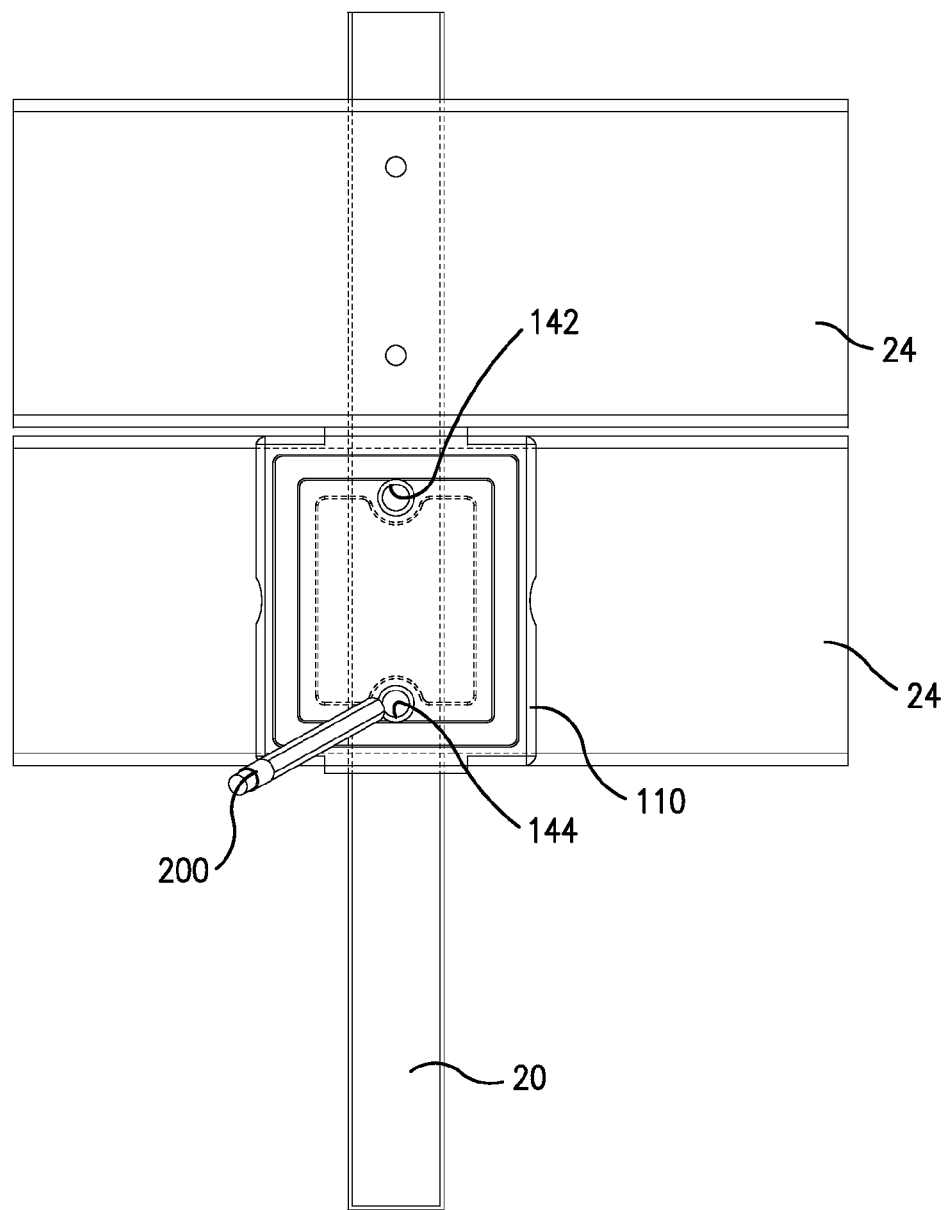
FIG. 12 is a top plan view of the deck board, joist, fastener alignment guide, fasteners and pencil of FIG. 11.
Figure 13:
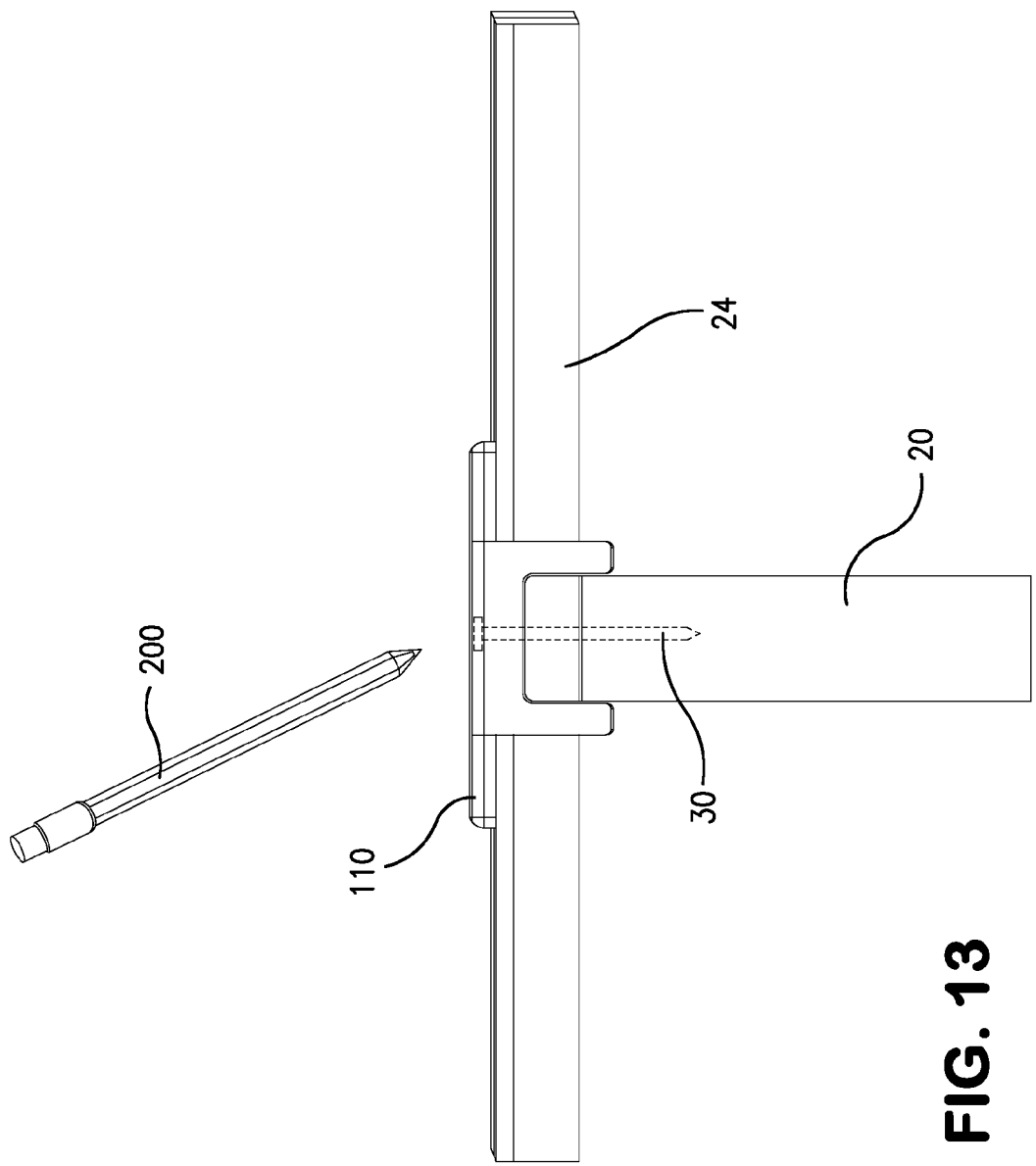
FIG. 13 is an end view of a deck board, joist, fastener alignment guide and pencil of FIG. 11 with a fastener illustrated in phantom.
Figure 14:
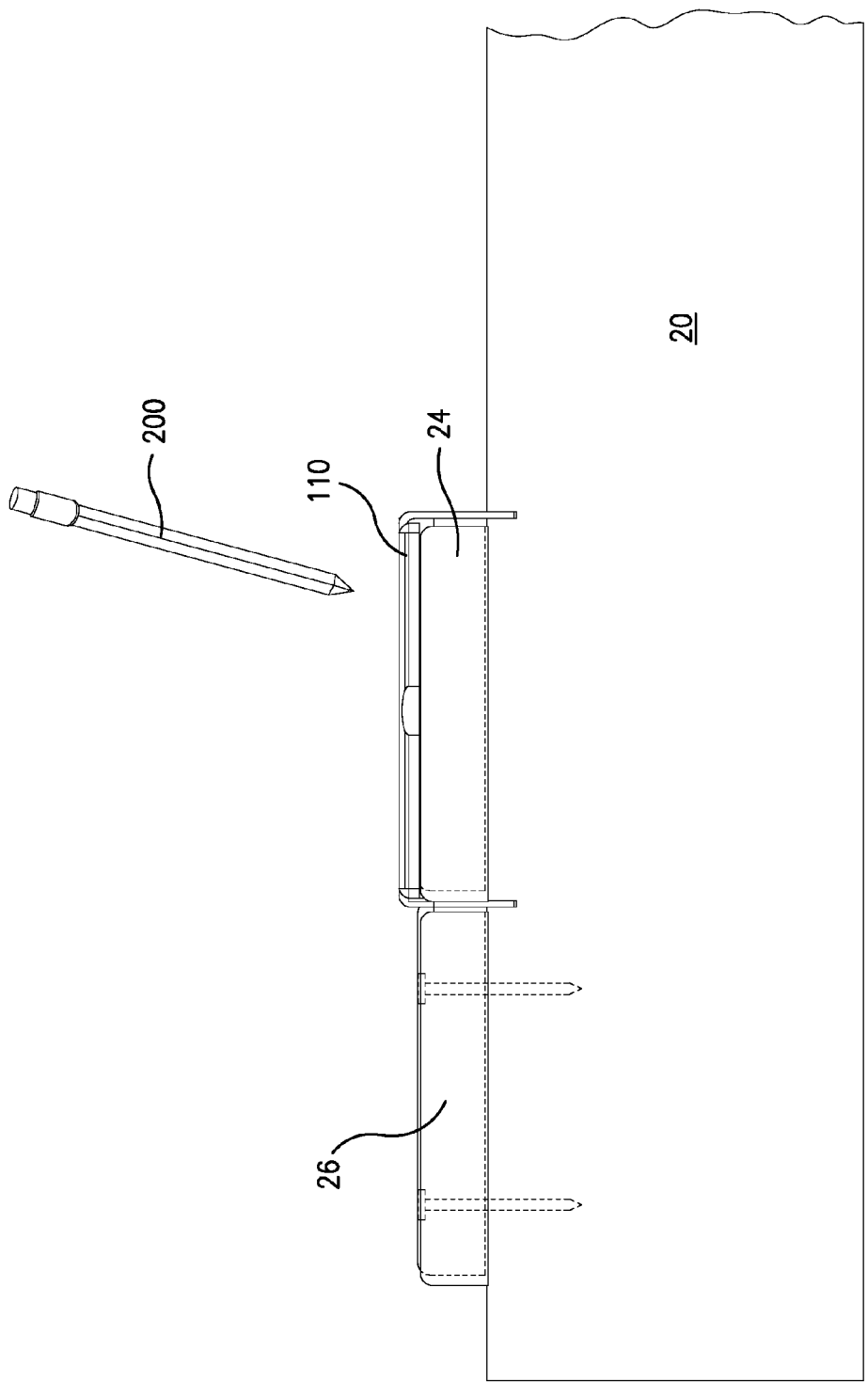
FIG. 14 is a side view of the deck board, joist, fastener alignment guide and pencil of FIG. 11 with a fastener illustrated in phantom.

The fastener alignment guide 10 is dimensioned so that the template 40 rides on the top of the deck board 24 and is self-centered on the joist 20 by the edges 54, 56 of the wings. Upon placement of the alignment guide, as illustrated in FIGS. 3-5, the proper location for the fasteners 30 is identified. The fasteners may then be placed and driven through the openings 42, 44 and the deck board into the joist 20 until the fastener head 34 seats below the surface of the deck board or at the surface of the deck board depending upon the preferred installation.

Figure 2:
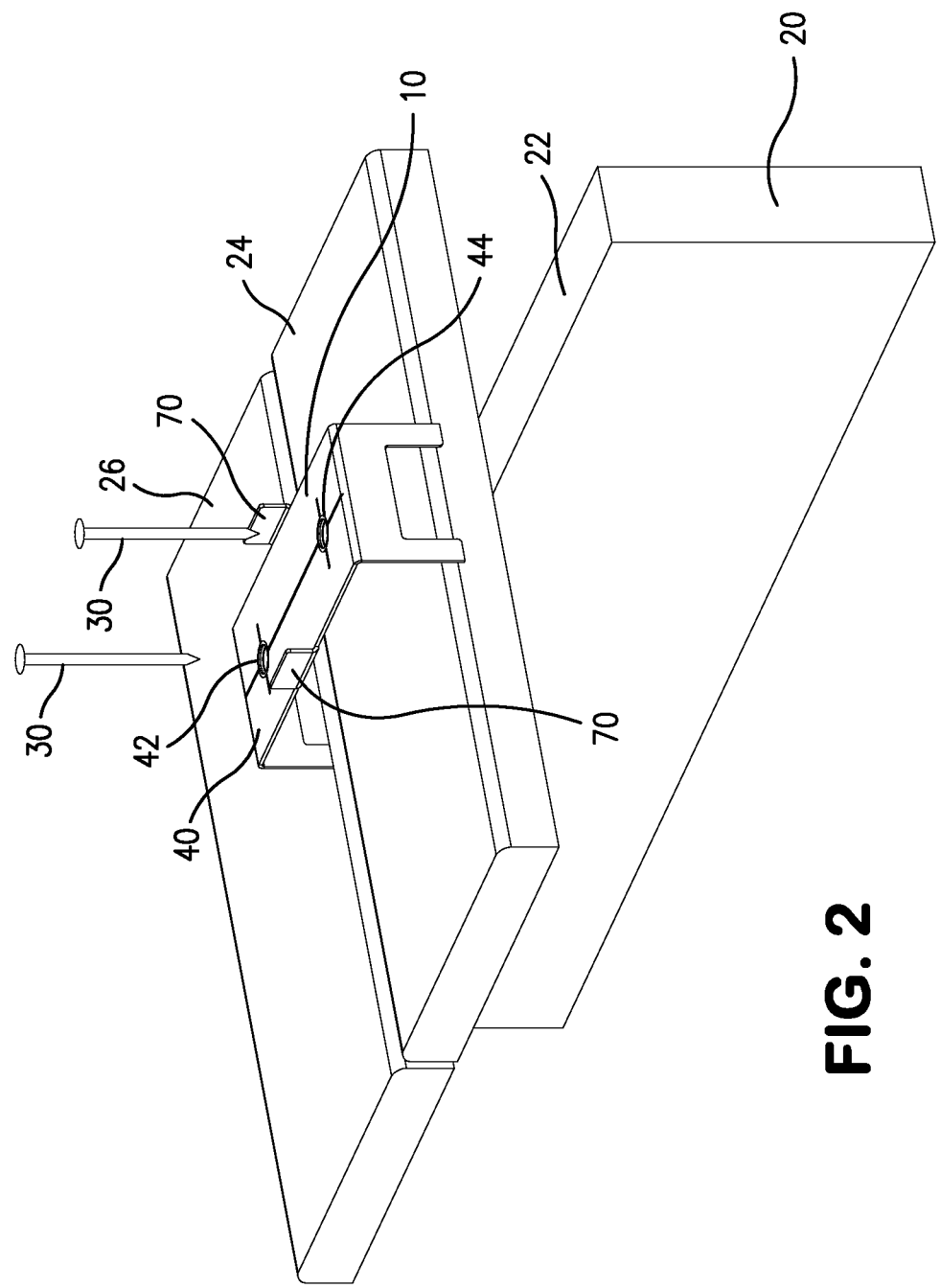
FIG. 2 is a perspective view, partly diagrammatic, of a pair of representative deck boards and a joist together with the fastener alignment guide of FIG. 1 which is in the process of being positioned for use in conjunction with locating a pair of fasteners for securing the deck board to a joist.

Referring to FIGS. 1, 2, and 5, the wings 54 and 56 also act as spacers to ensure consistent horizontal spacing between neighboring deck boards 24 and 26. The wings have a depth Δ, which may vary dependent upon the type of lumber used to construct the deck. In one embodiment intended for use with pressure treated deck boards, the depth Δ of the wings 54 and 56 is selected from a range between approximately 1/16" and approximately 1/8". In another embodiment intended for use with composite deck boards, the depth Δ of the wings 54 and 56 is selected from a range between approximately 3/16" and approximately 1/4".

In one form, the openings 42, 44 are circular and have a substantially equal diametral dimension that fully accommodates the head 34 of the fastener. Alternatively, the openings may have a narrower dimension so that a pencil may be employed to mark the proper location, in which case, the alignment guide is removed, and then the fasteners are driven at the marked placements.

Figure 15:
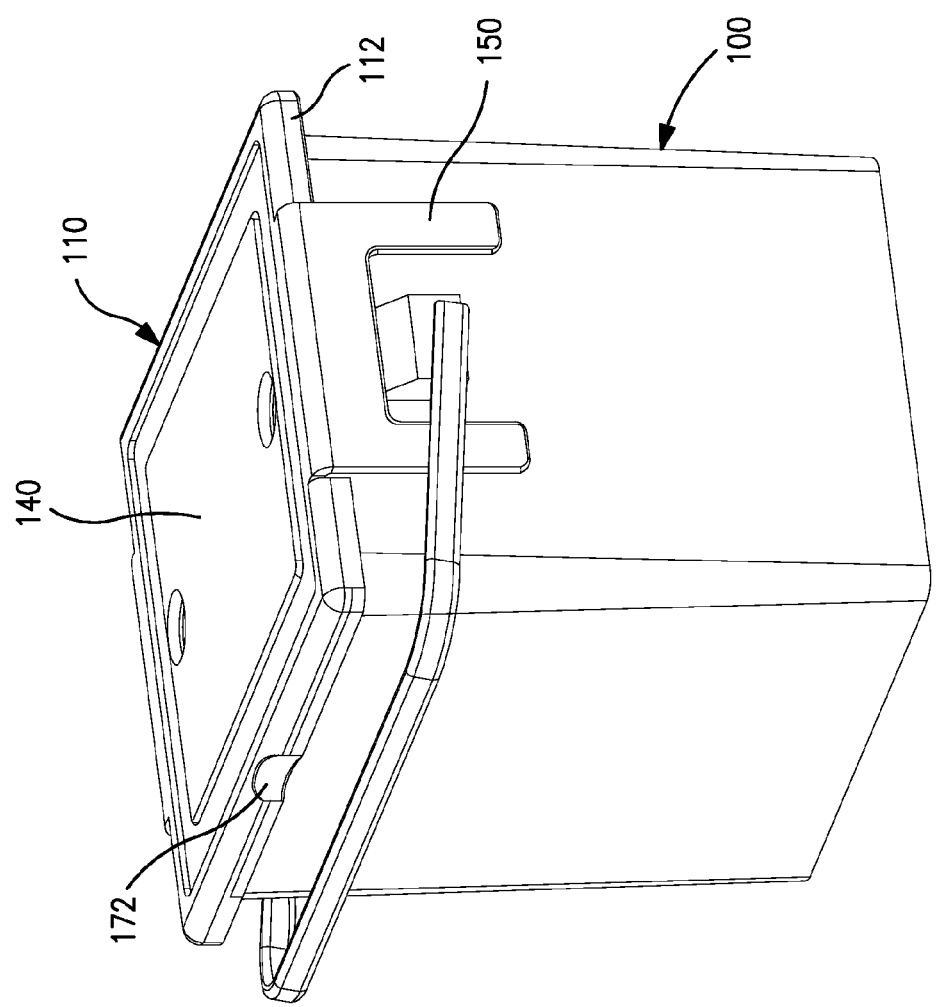
FIG. 15 is a perspective view of a bucket for deck fasteners wherein the fastener alignment guide of FIG. 6 functions as a lid for the bucket.
Figure 16:
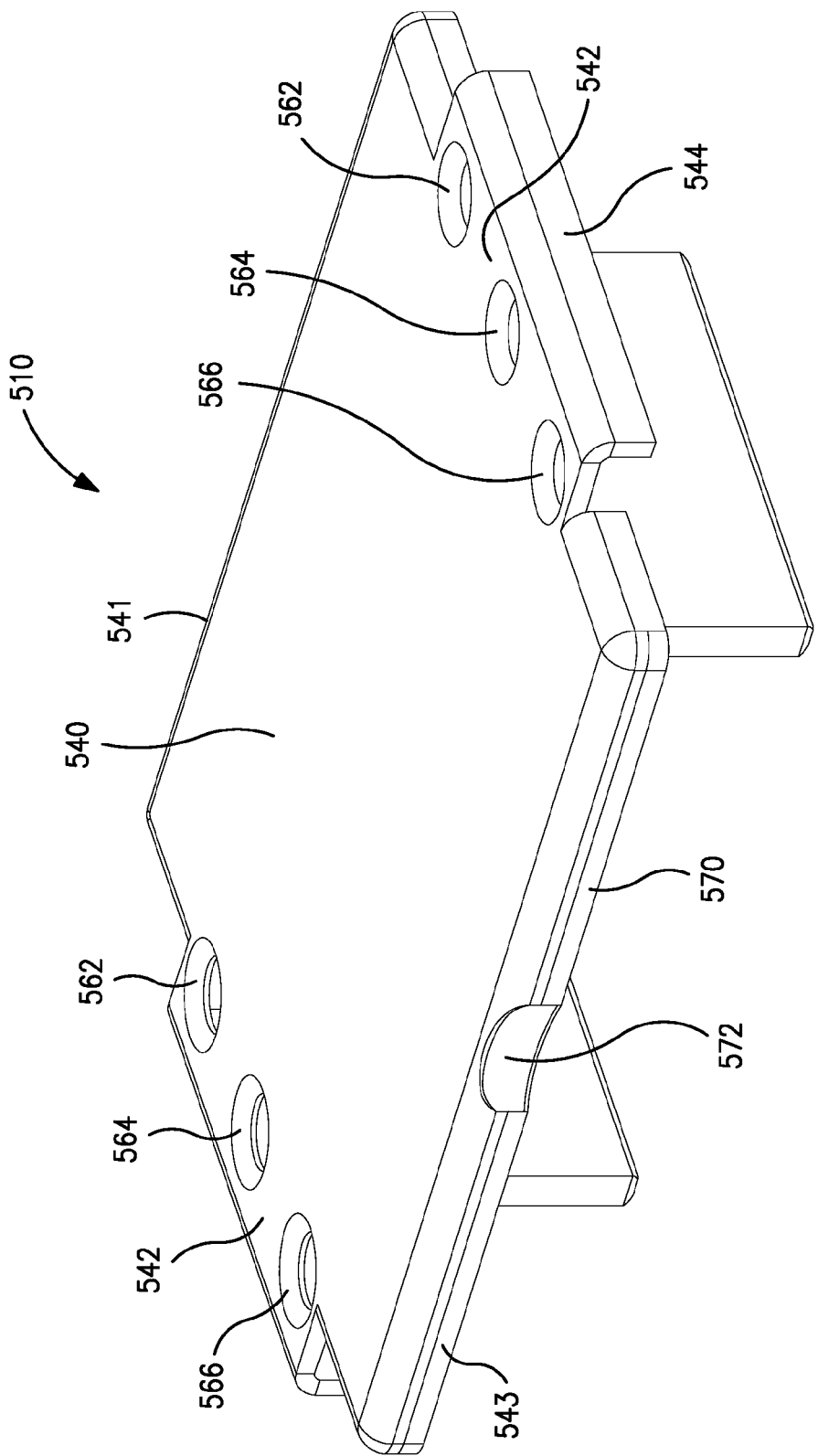
FIG. 16 is a perspective view of a fastener alignment guide for a baluster.
Figure 17:
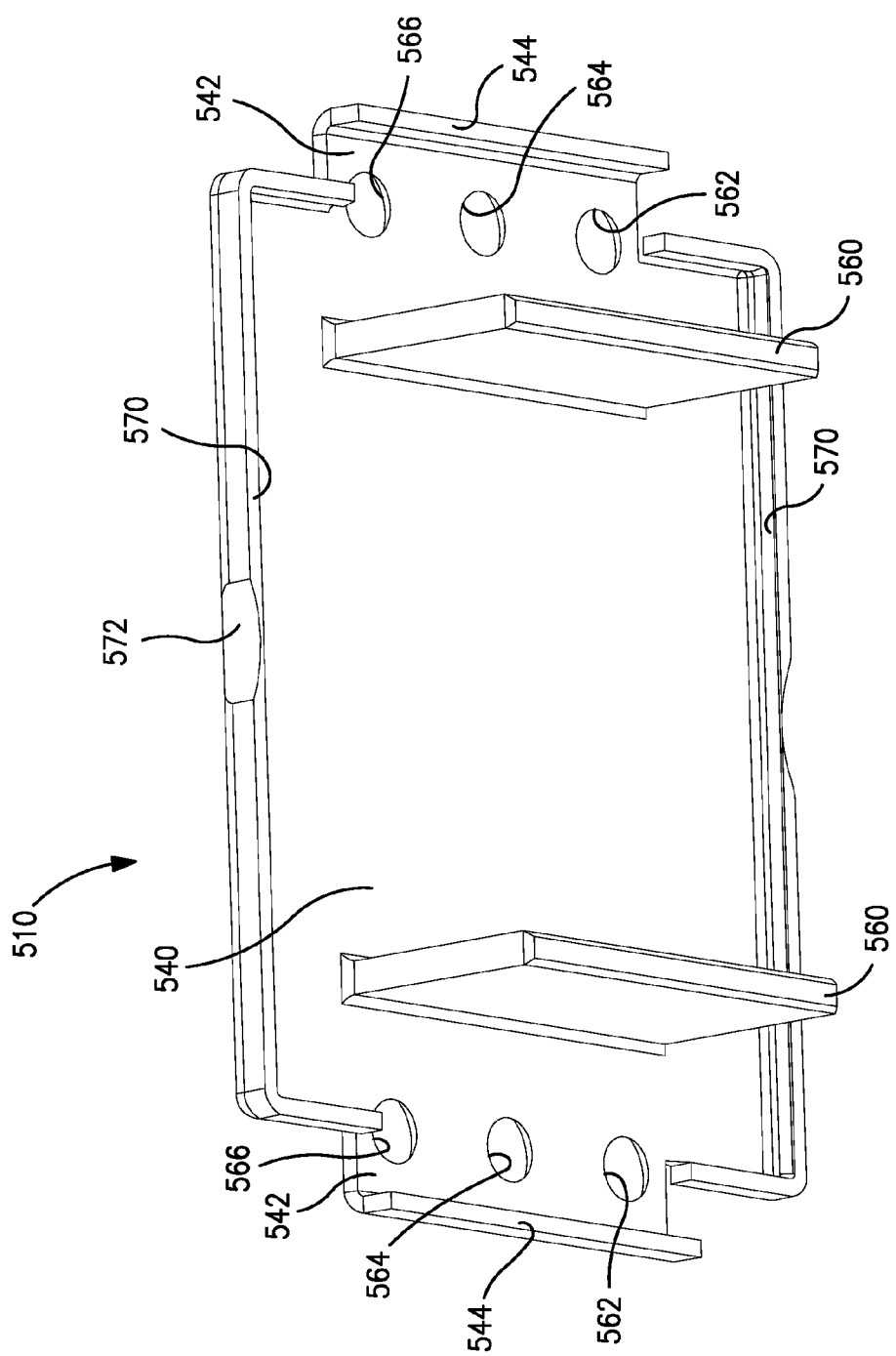
FIG. 17 is a generally underside perspective view of the fastener alignment guide of FIG. 16.
Figure 18:
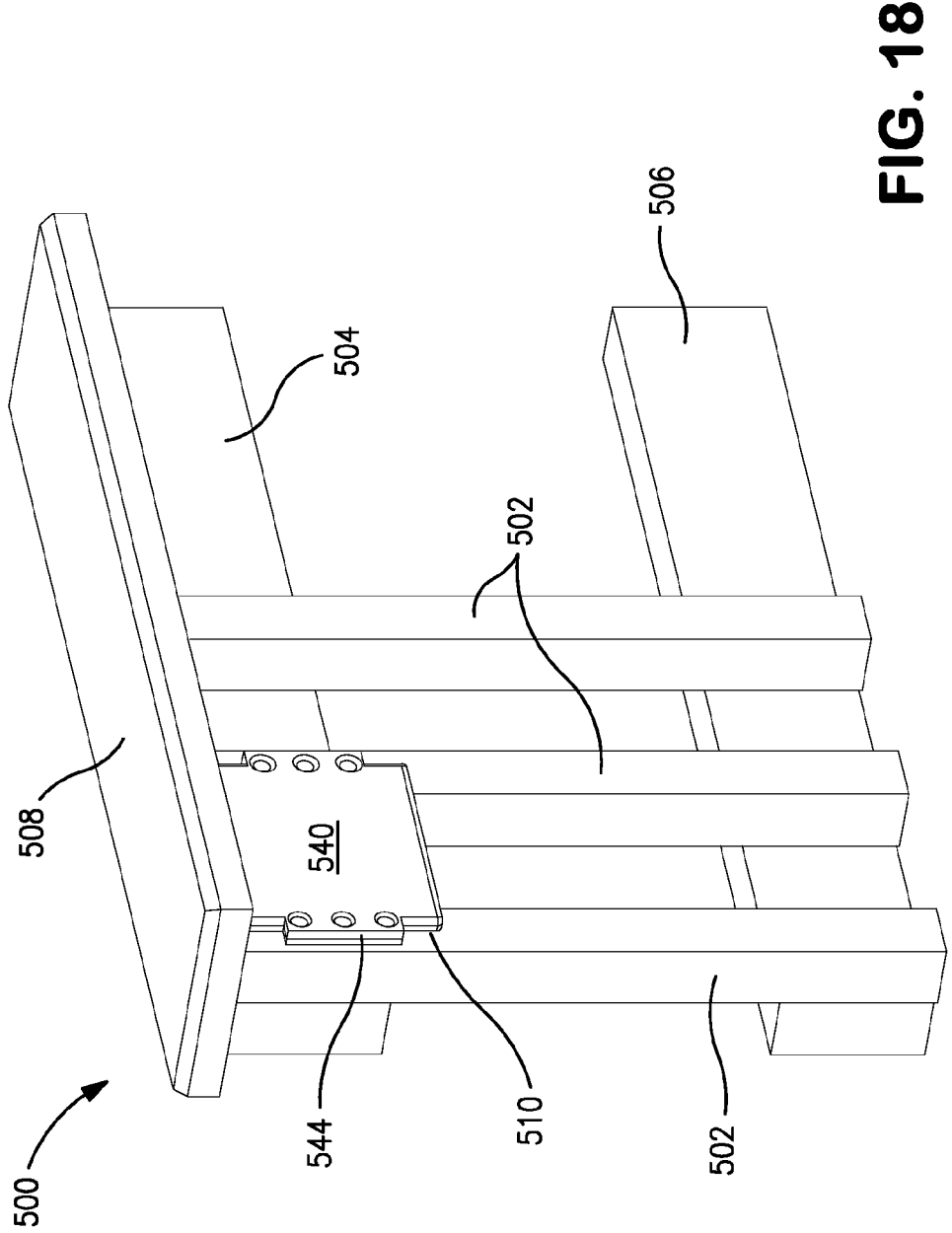
FIG. 18 is a perspective view of the fastener alignment guide of FIG. 16 as employed for constructing a balustrade.
Figure 19:
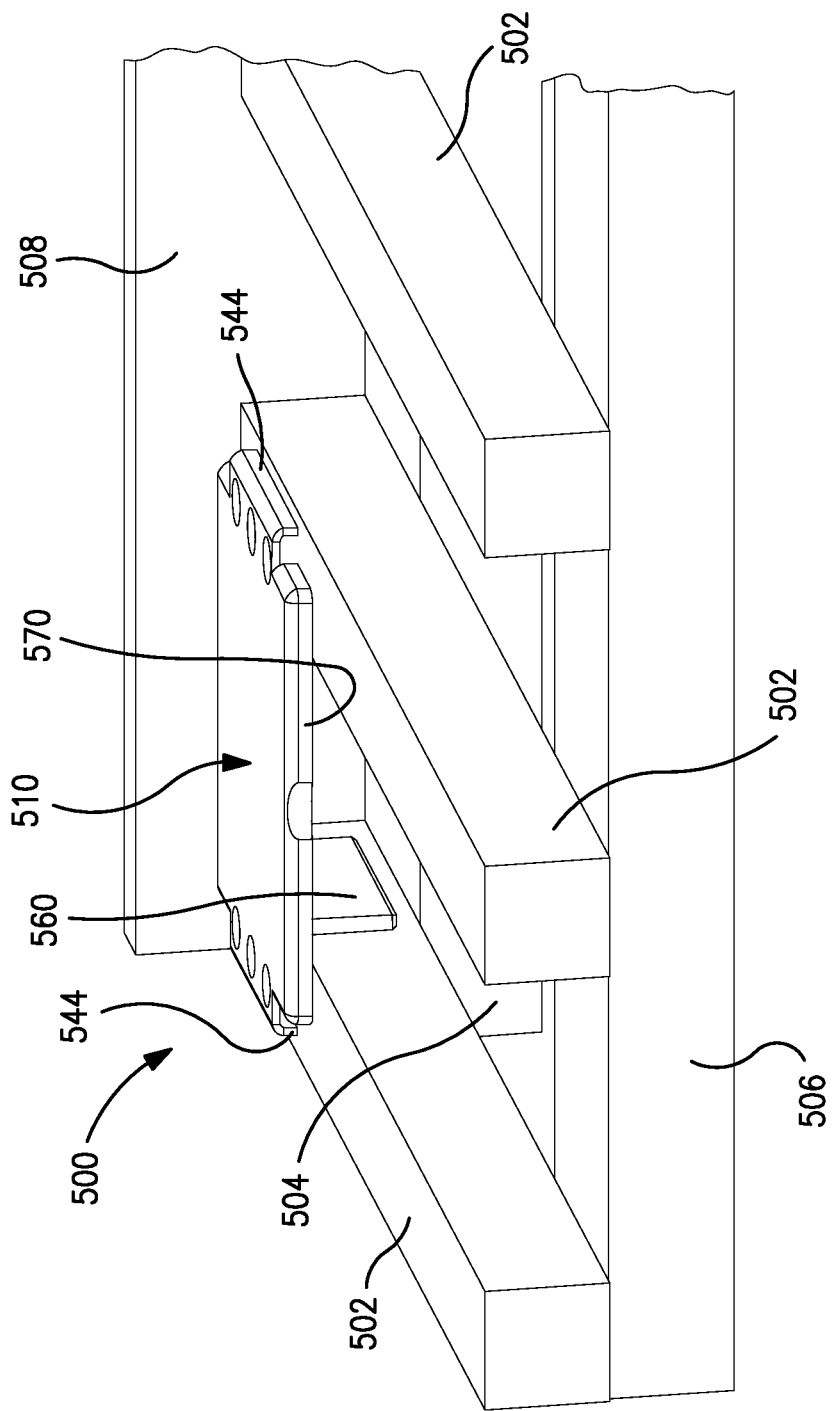
FIG. 19 is a perspective view of the alignment guide/balustrade assembly of FIG. 18 from a generally bottom perspective view.
Figure 20:
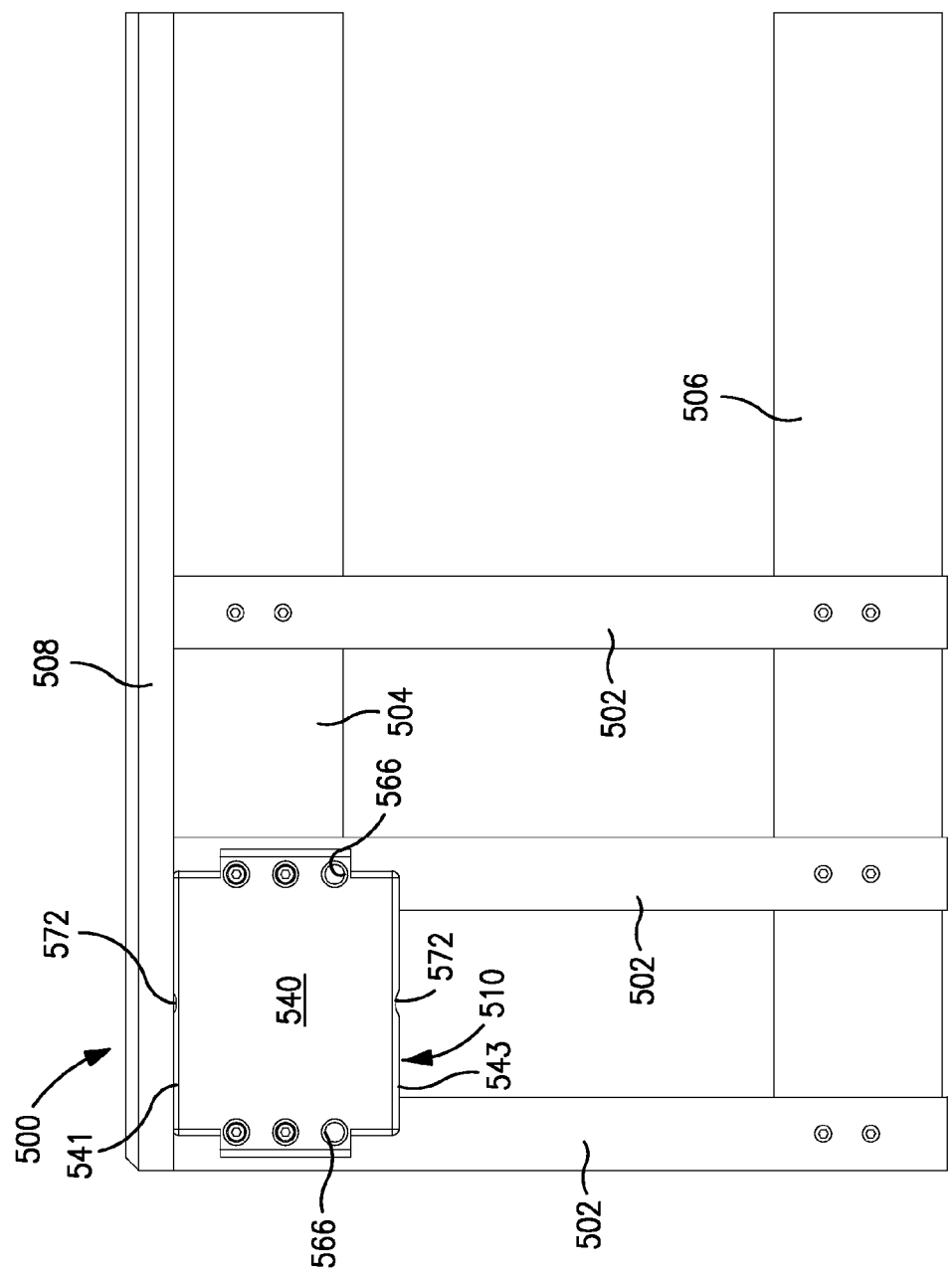
FIG. 20 is a frontal functional view of the alignment guide with installed fasteners and a front elevational view of the balustrade of FIG. 18.

In a second embodiment, the fastener alignment guide 110 is also in the form of a cover for a bucket 100 of deck fasteners (FIG. 15). The corresponding components are identified by the same numerals as designated for fastener alignment guide, except that they are designated by a lead digit "1". The bucket 100 is generally rectangular with contoured corners. Both the fastener alignment guide 110 and the bucket 100 are preferably molded plastic members.

Alignment guide 110 includes a peripheral lip 112 which resiliently engages the upper sides of the bucket. A template 140 includes a pair of openings 142, 144 which are equidistantly spaced from the opposed sides as well as equidistantly spaced from the ends. The fastener alignment guide is employed to properly locate fasteners for securing a deck board in a manner similar to that for a fastener alignment guide 10.

The wings 150 include the engagement edges 154, 156 which are spaced a distance t. The wings are parallel and perpendicular to the template 140 and are spaced a distance w. For the embodiment of the fastener alignment guide 110, a pair of indentations 172 is formed on opposed sides for facilitating the removal of the cover (guide 110) from the bucket, as well as facilitating the mounting of the template over the deck board so that the wings 150 seat on the joist 20 in a saddle-like fashion. The alignment guide 110 thus efficiently functions as both a cover for the bucket of fasteners, as well as a fastener alignment guide employed for installation of the deck boards.

With reference to FIGS. 11-14, fastener alignment guide 110 and fastener alignment guide 10 (not illustrated) may be alternatively employed to mark the proper location of the fasteners by means of a representative pencil 200. When the guides 110 and 10 are used in the latter manner, the guides are removed prior to driving the fasteners.

With reference to FIG. 16-22, a fastener alignment guide for constructing a balustrade 500 (partially illustrated) comprising a plurality of equidistantly spaced balusters 502 is generally designated by the numeral 510. The alignment guide 510 is adapted to properly locate the placement of fasteners for securing balusters to a horizontal upper support beam 504 and a horizontal lower support beam 506 of a balustrade and to properly locate the spacing for the balusters 502. The balusters 502 may assume various configurations. For purposes of description, each baluster 502 has an elongated shape with a square cross section. Typically, a rail 508 is disposed over the balusters 502. The balusters 502 have a uniform length and thus provide a uniform railing height upon installation.

The fastener alignment guide 510 comprises a central template or platform 540 which includes opposed extensions 542 extending from the central portion of the ends. The extensions terminate in downwardly protruding flanges 544 which generally extend perpendicular to the template. The template 540 preferably further has two sets of three aligned openings 562, 564, 566 of substantially identical circular shape and dimension and equidistantly spaced from the extreme edge of each extension 542. The openings 562, 564, 566 define the locations for the fasteners. Typically, only two of the three openings are used for a given placement depending on whether the guide is employed at the top (openings 562, 564), or the bottom (openings 564, 566).

The platform 540 includes a pair of opposed tri-segmented lips 570 which also extend downwardly from the platform to form a substantially perpendicular flange. Grips in the form of indentations 572 are formed at opposed sides of the alignment guide. In one preferred application, the lips resiliently engage the upper sides of a bucket for fasteners for the balusters so that guide 510 also functions as a cover.

Figure 21:
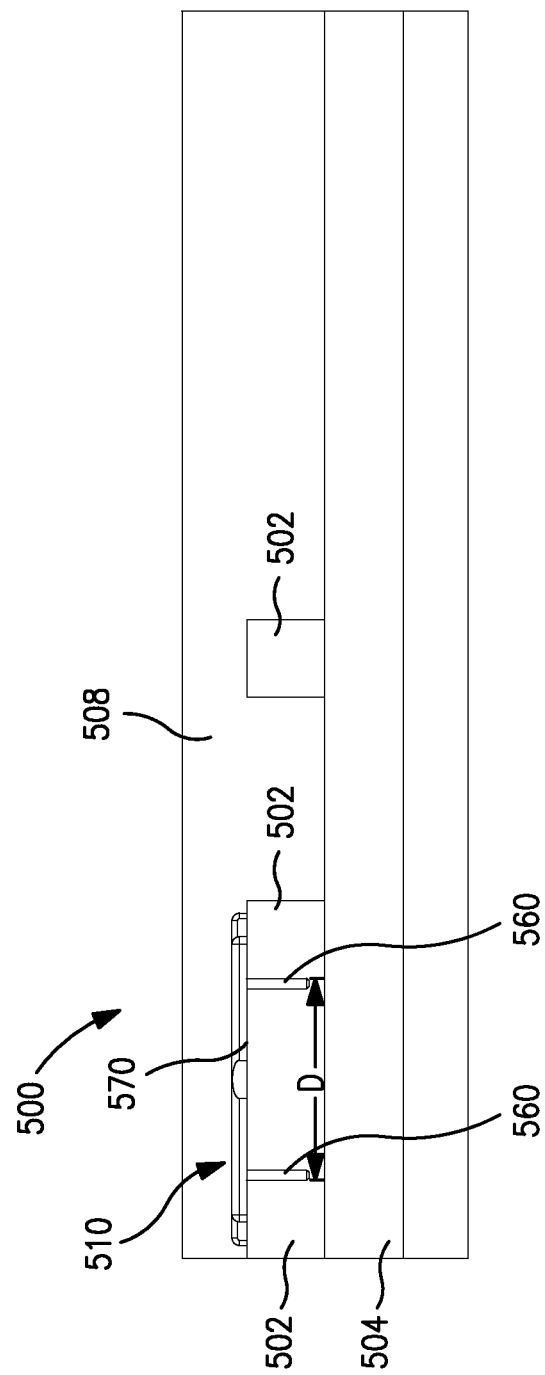
FIG. 21 is a bottom plan view, partly diagrammatic, of the fastener alignment guide and balustrade of FIG. 18.
Figure 22:
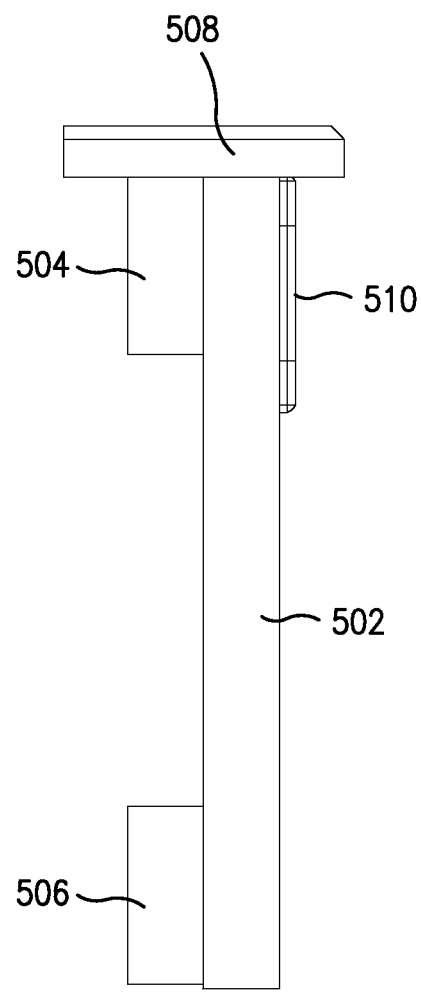
FIG. 22 is an end view of the fastener alignment guide and an end elevational view of the balustrade of FIG. 18.

Two parallel legs 560 extend downwardly from the underside of the platform 540 and are equidistantly spaced from the ends. The distance D between the outside surfaces of the legs 560 defines the inside spacing of the balusters (FIG. 21). The distance D corresponds to specific dimensions permitted by code, and in one embodiment D is less than 4". The ends of the flanges 554 terminate in a common plane with the terminal ends of the lips 570 and, in usage, are adapted to engage the outer surface of the baluster. The upper side edge 541 of the template 540 engages the underside of the rail and functions as a linear reference for the upper fastener location. The lower side edge 543 engages the floor or a lower rail and functions as a reference for the lower fastener location.

It will be appreciated that the baluster alignment guide 510 may be efficiently placed to properly locate the vertical balusters and engage against the underside top of the rail. The upper openings 562, 564 locate the proper position for the fasteners (at the longitudinal midline of the baluster 502 for each adjacent baluster). In one preferred form, the openings are greater than the heads of the fasteners so that the fasteners may be driven through the openings and baluster into the support beam. The fasteners are located and driven through openings for each of the vertical balusters.

The alignment guide 510 may also be employed (slid downwardly) to properly locate the fasteners at the bottom of each of the vertical balusters. In the latter case, the lower two openings 564, 566 are preferably employed.

The alignment guide is then removed and mounted to the last fastened baluster and the legs 560 are employed for properly spacing the next baluster the distance D as permitted by code.

In some embodiments, the alignment guide for a baluster may have smaller openings so that a pencil may be employed to mark the center of the openings, and the alignment guide removed prior to driving the fasteners through the balusters 502 into the support beam.

With reference to FIGS. 23-31, an alternate embodiment of the bucket and lid combination of FIG. 15 is illustrated. Components corresponding to other embodiments of a fastener alignment guide and container lid are identified by the same numerals, except that they are designated by lead digits "10."

Figure 23:
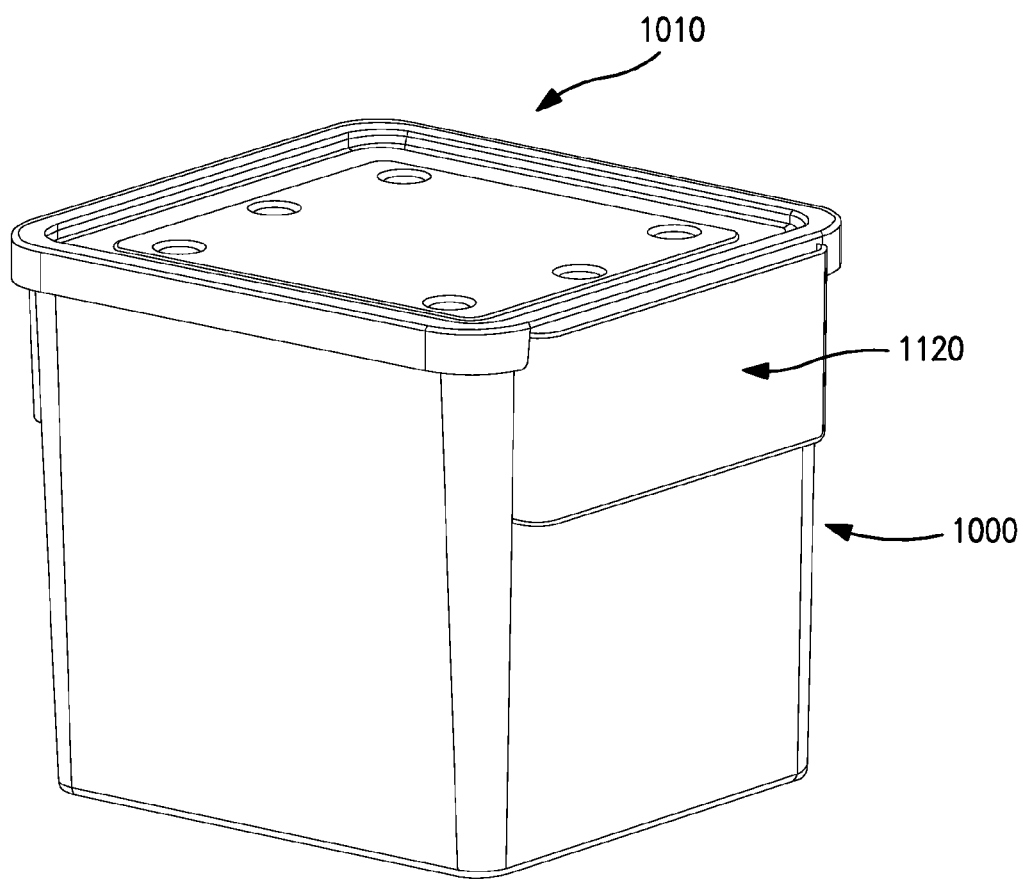
FIG. 23 is a perspective view of one embodiment of a container and a corresponding lid having an alternate embodiment of the fastener alignment guide for a face mounted deck board depicted in FIGS. 1-22.

With reference to FIG. 23, a fastener alignment guide 1010 also acts as a lid which complements a container 1000 of deck fasteners. The container 1000 is generally cube shaped, and specifically constructed to withstand heavy loads and retain its shape. The container 1000 and lid/fastener alignment guide 1010 are preferably constructed from a heavy duty plastic polymer, but may be alternatively constructed of a durable lightweight metal.

Figure 24:
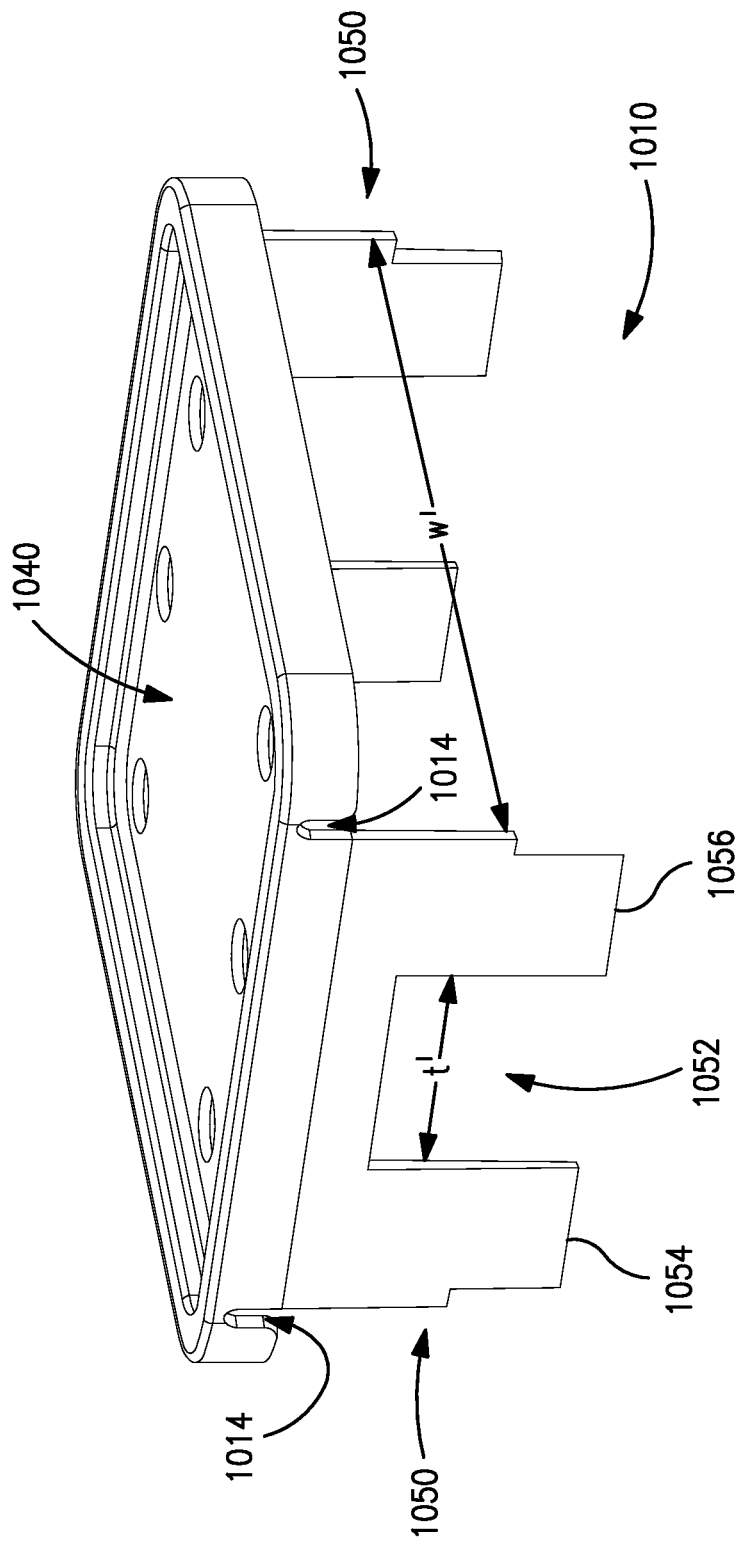
FIG. 24 is a perspective view of the lid of the embodiment of the container illustrated in FIG. 23, the container being omitted for clarity.
Figure 25:
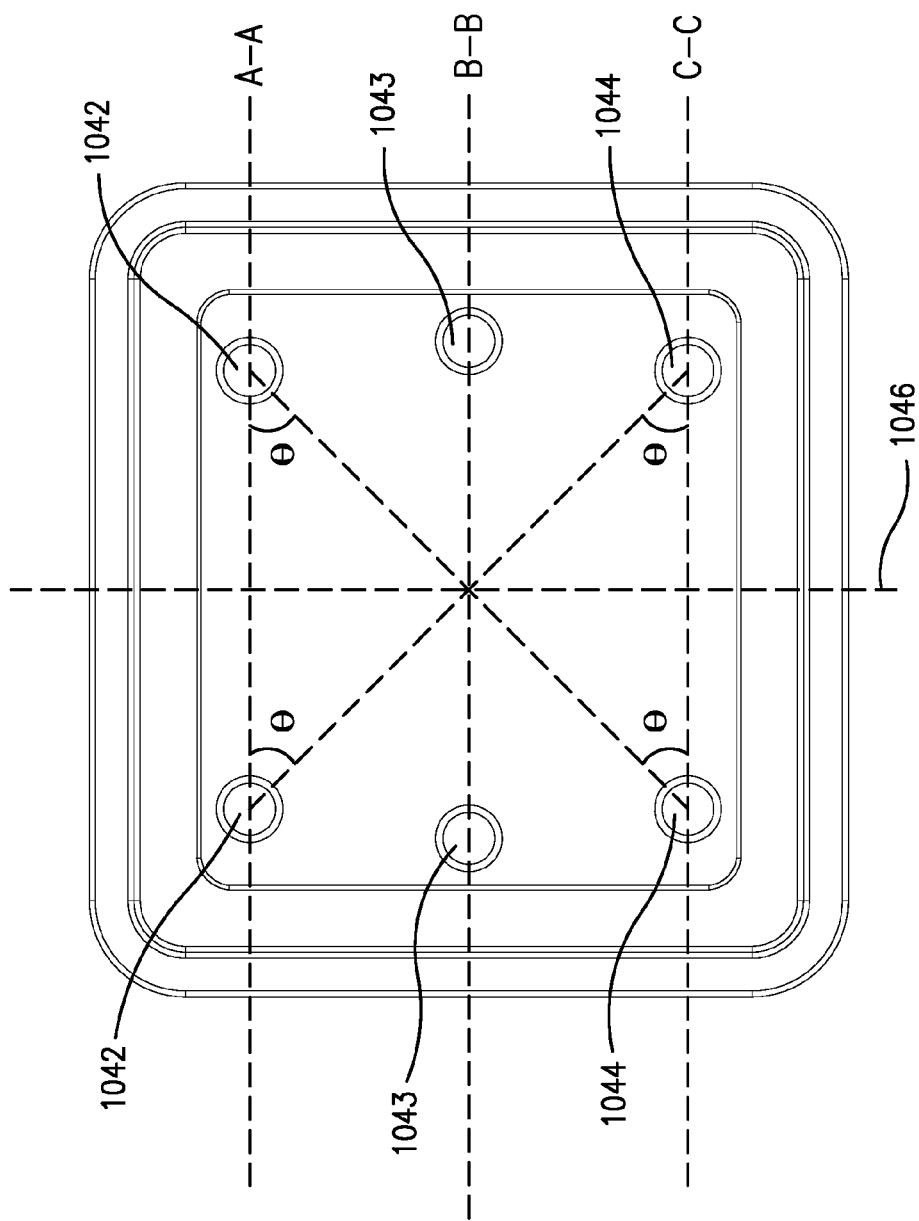
FIG. 25 is a top plan view of the lid illustrated in FIG. 24.

With reference to FIGS. 24-27, the lid/fastener alignment guide 1010 has a template 1040. As seen in FIG. 25, the template 1040 defines a plurality of laterally opposed pairs of openings 1042, 1043, and 1044. In one form, the openings 1042, 1043, and 1044 are circular and have a substantially equal diametral dimension that fully accommodates a head of a fastener (not shown). Alternatively, the openings may have a narrower dimension so that a pencil may be employed to mark the proper location, in which case, the alignment guide is removed, and then the fasteners are driven at the marked placements.

In the embodiment depicted in FIGS. 24 and 25, the template 1040 has a central medial axis 1046. Each opening of each pair of laterally opposed openings 1042, 1043, and 1044 is equidistantly spaced from the central medial axis 1046, such that the central medial axis 1046 bisects lateral axes A-A, B-B, and C-C upon which the pairs of laterally opposed openings 1042, 1043, and 1044, respectively, lie. Lateral axes A-A, B-B, and C-C are oriented parallel to one another, and perpendicular to the central medial axis 1046.

The configuration of laterally opposed pairs of openings 1042 and 1044 facilitates joining fasteners (not shown) to a deck board at a consistently precise angle $\theta$, as measured with respect to the axes A-A and C-C. In one embodiment, the angle $\theta$ created using this method is 45°.

To secure fasteners (not shown) at an angle $\theta$, a user secures a first fastener at a point corresponding to a single opening 1042 or 1044. Next, the user secures a second fastener in the opening on the opposite side of the medial axis 1046, and lying on the other lateral axes A-A or C-C. For instance, if a first fastener is secured in an opening 1042, the second fastener must be secured in the opening 1044 on the opposite side of the medial axis 1046 from the first fastener on lateral axis C-C or vice-versa. Openings 1043 on axis B-B are utilized to install fasteners in a direction perpendicular to the length of the deck board (not shown).

Figure 26:
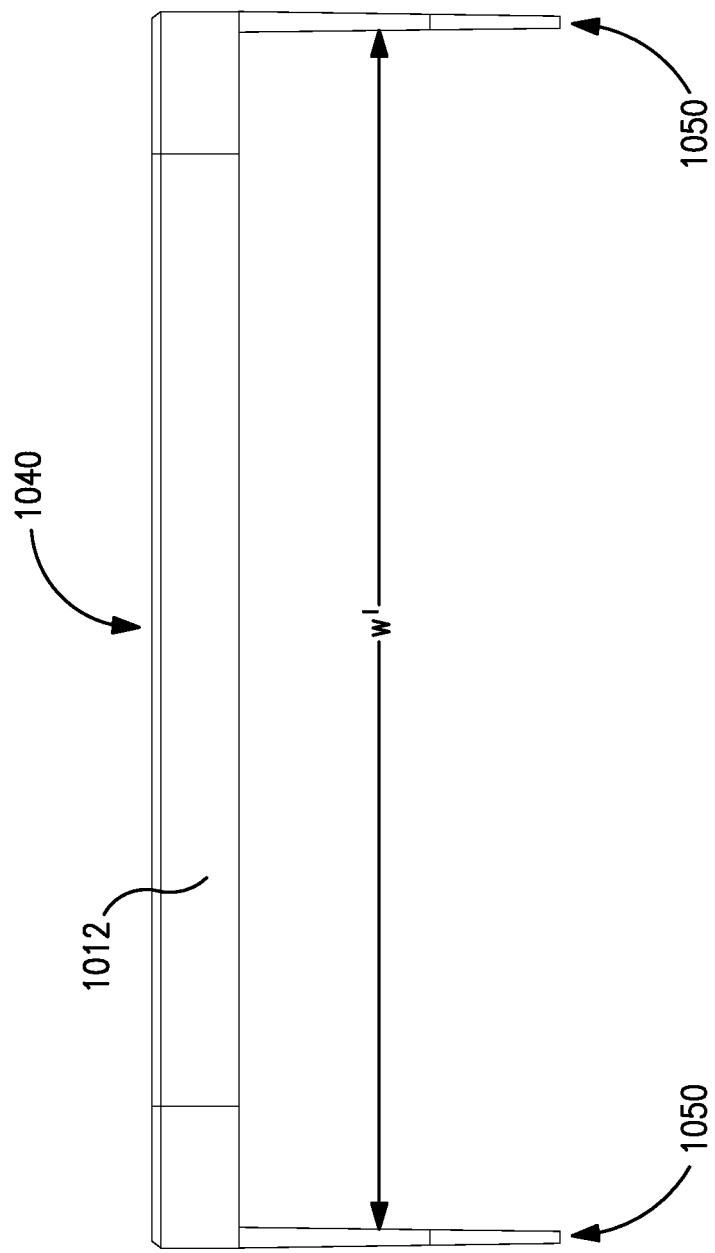
FIG. 26 is a side view of the lid illustrated in FIG. 24.
Figure 27:
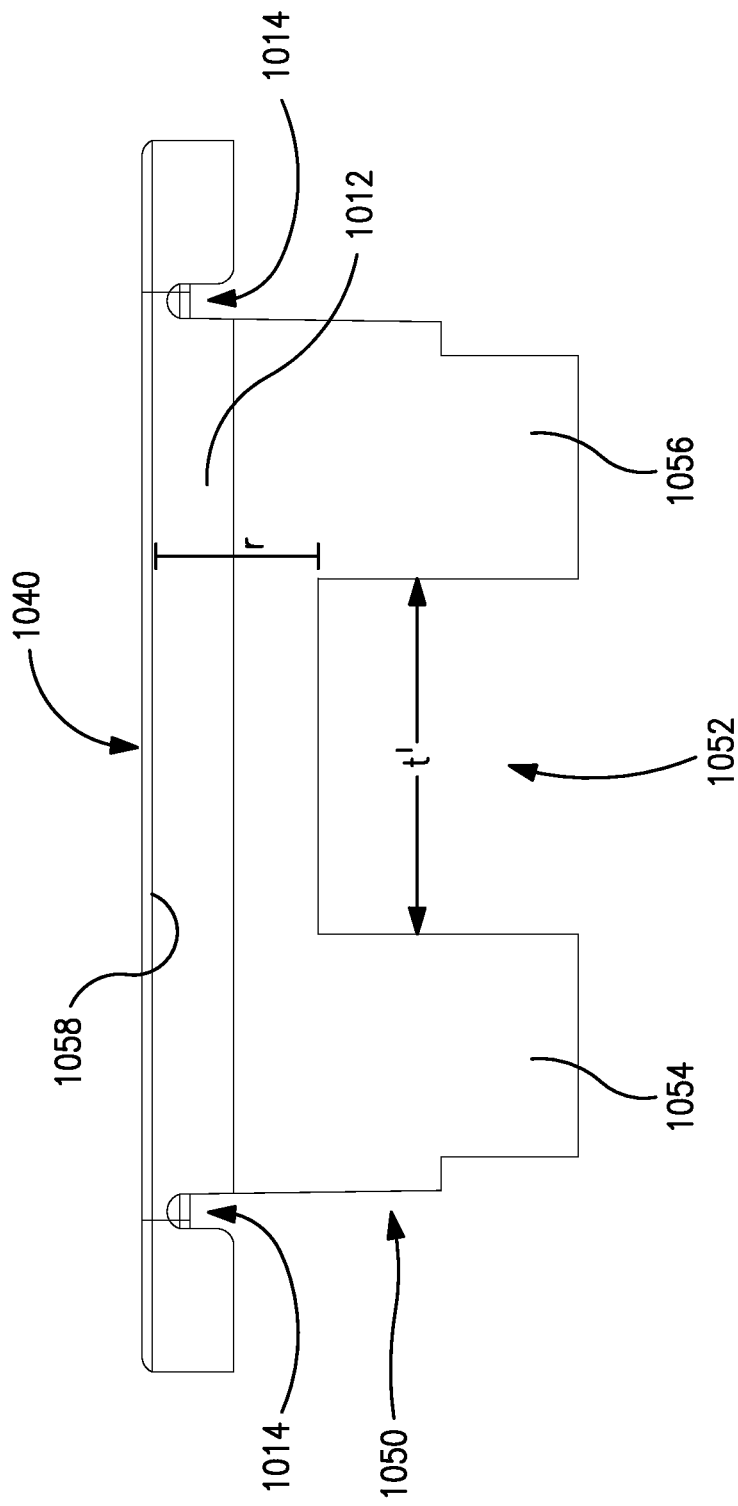
FIG. 27 is a side view of the lid illustrated in FIG. 24.

As seen in FIGS. 24, 26, and 27, the lid/fastener alignment guide 1010 has two opposed substantially identical wings 1050, which extend generally perpendicular to the template 1040. The wings 1050 preferably have a generally rectangular recess 1052 defined by a pair of parallel edges 1054 and 1056 which are spaced a distance t'. The wings 1050 are parallel and perpendicular to the template 1040, and spaced a distance w'. The distance t' corresponds to the thickness t of a joist (not shown), and the distance w' corresponds to the width w of a deck board (not shown).

Referring to FIGS. 24 and 26, the wings 1054 and 1056 also act as spacers to ensure consistent horizontal spacing between neighboring deck boards (not shown). The wings 1054 and 1056 have a depth Δ', which may vary dependent upon the type of lumber used to construct the deck. In one embodiment intended for use with pressure treated deck boards, the depth Δ' of the wings 1054 and 1056 is selected from a range between approximately 1/16" and approximately 1/8". In another embodiment intended for use with composite deck boards, the depth Δ' of the wings 1054 and 1056 is selected from a range between approximately 3/16" and approximately 1/4".

Figure 28:
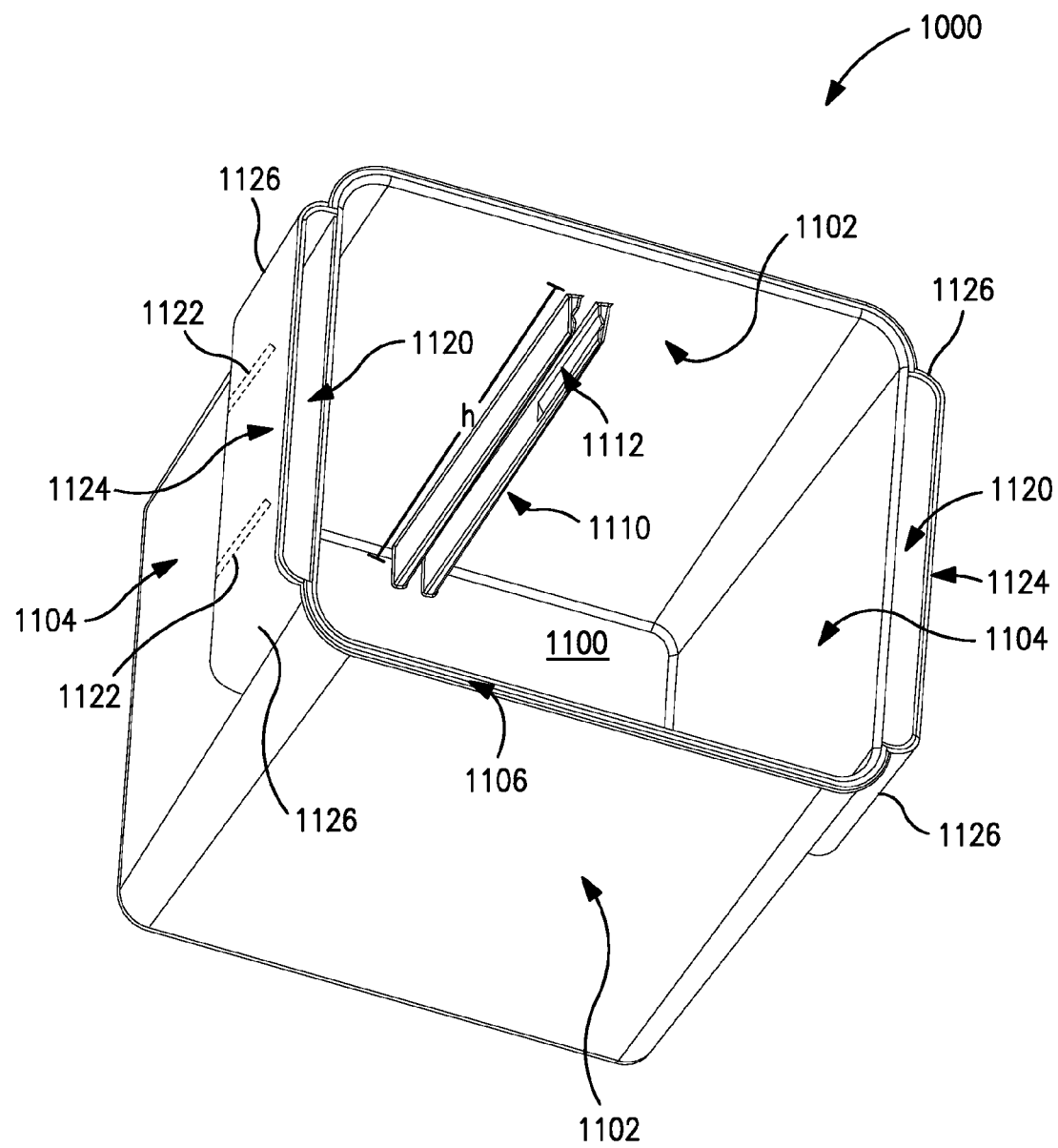
FIG. 28 is a perspective view, partly in phantom, of one embodiment of the container illustrated in FIG. 23, the lid being omitted for clarity.
Figure 29:
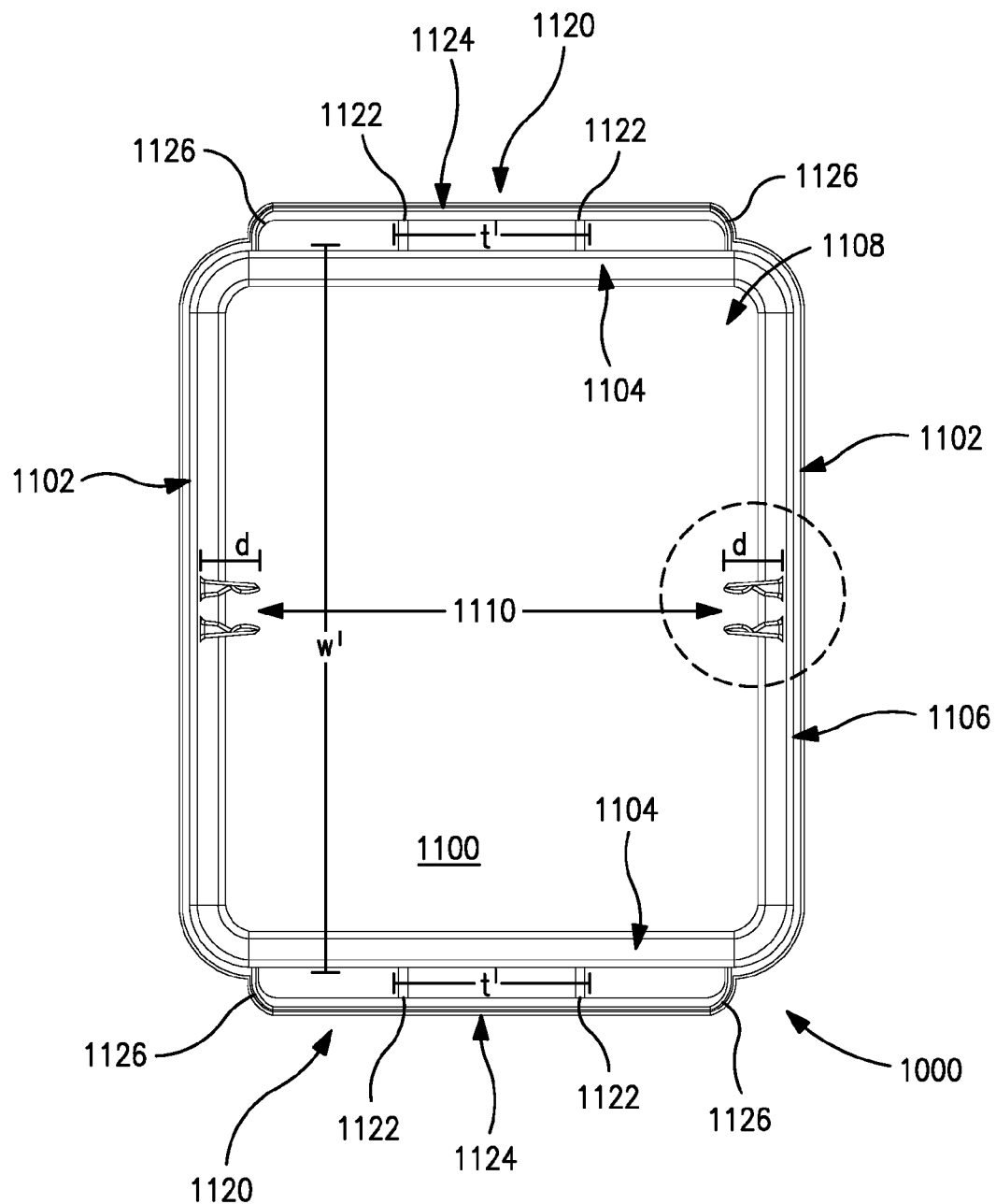
FIG. 29 is a top plan view of the container illustrated in FIG. 28.

With reference to FIGS. 28 and 29, the container 1000 is generally cube shaped, and has a substantially flat bottom 1100 and opposed pairs of side walls 1102 and 1104. A container lip 1106 defines a container opening 1108 axially opposite the bottom 1100 of the container. In one embodiment, the exteriors of the opposed pair of sidewalls 1104 are separated from one another by the distance w, at a height of the container adjacent the container lip 1106. In one embodiment, the container 1000 has a handle (not shown) connected adjacent the container lip 1106.

Figure 30:
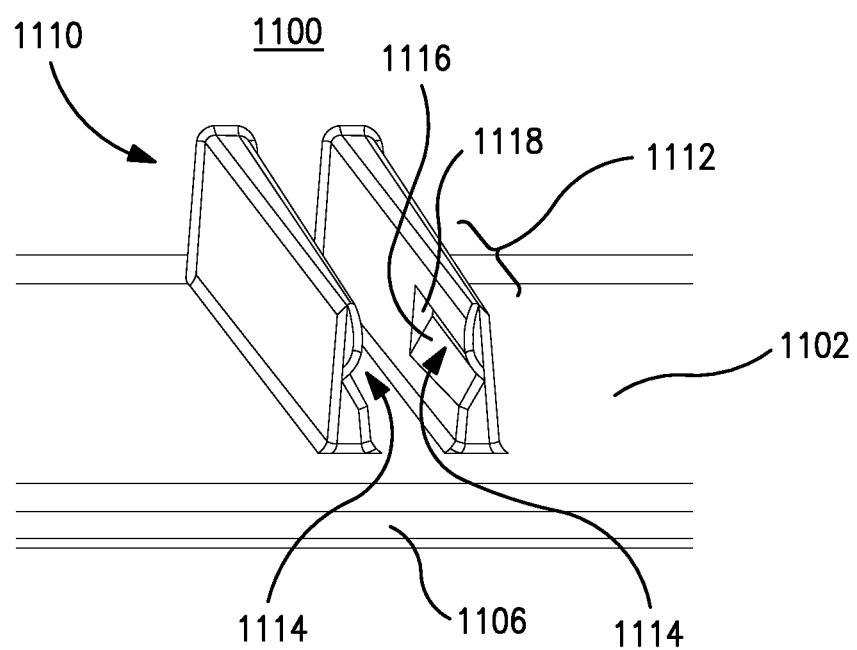
FIG. 30 is an enlarged perspective view of the container illustrated in FIG. 28, with particular emphasis on the structural ribs and bit holder of the container.

As seen in FIGS. 28-30, opposed pair of sidewalls 1102 have generally parallel pairs of structural ribs 1110. The structural ribs 1110 are integral with and project perpendicularly away from the opposed sidewalls 1102 and the bottom 1100. The structural ribs project away from the sidewalls 1102 by a depth d and from the bottom 1100 by a height h.

In one embodiment an exterior surface of the container 1000 defines a pair of channels 1111 (not shown). The channels 1111 are sized to receive the structural ribs 1110, so that multiple containers 1000 may be stacked together. The channels 1111 are formed on the exterior surface of opposed sidewalls 1104, and are configured to be recessed from an exterior surface of the container. The channels 1111 are configured to run from the bottom of the container 1100 a height h' and to be recessed from the exterior surface of the opposed sidewalls 1104 a depth d'. The height h' and depth d' of the channels 1111 correspond to the height h and depth d of the structural ribs 1110.

Each pair of structural ribs defines a bit holder 1112 adjacent the lip 1106 of the container 1000 (FIGS. 28 and 30). The bit holder 1112 is defined by substantially identical pairs of recessed cavities 1114 defined in each individual structural rib 1110. Each cavity 1114 has a generally v-shaped sidewall 1116 extending vertically from and perpendicularly to a bottom 1118. The cavities 1114 of each bit holder 1112 are configured to receive and secure the torque-side of a bit (not shown), such as a Ttap 25 Drive Bit keyed to the OMG TrapEase®III or Trio™ deck screws. The bit holder 1112 retains the bit (not shown) between the cavity sidewalls 1116 and bottom 1118.

The bit holders 1112 are configured adjacent the container lip 1106 to maintain the bit in place and separate the bit from the fasteners in the container. The bit will not fall out of the bit holder 1112 and mix with the fasteners if the container is jostled or upended, provided the lid/fastener alignment guide 1010 is secured to the container 1000.

In one embodiment depicted in FIGS. 23, 28, 29 and 31, a sleeve 1120 projects from the exterior periphery of each of the pairs of opposed sidewalls 1104. Each sleeve 1120 is configured to receive the wings 1050 of the lid/fastener alignment guide 1010.

Each sleeve has a pair of vertical reinforcement struts 1122 integral with and extending perpendicular between a peripheral wall 1124 of each sleeve 1120 and the exterior of the opposed sidewalls 1104. In one embodiment shown in FIG. 28, each vertical reinforcement is recessed from the lip of the container 1106 a distance r, which corresponds to the distance r between the top of the rectangular recess 1052 of the wings 1050 and an underside 1058 of the template 1040 (FIG. 27). In another embodiment, reinforcement struts 1122 are separated from one another by the distance t, corresponding to the width measured between the parallel edges 1054 and 1056.

The structural ribs 1110 and the sleeves 1120 cooperate to reinforce the structure of the container 1000, and ensure that the container 1000 retains its shape even when the container is filled with deck fasteners (not shown). The structural ribs 1110 vertically reinforce the opposed sidewalls of the container 1000, and prevent the container 1000 from torsionally warping and deforming. Additionally, the sleeves 1120 and the vertical reinforcement struts 1122 cooperate with structural ribs 1110 to reinforce the peripheral shape of the opening 1108, when the container 1000 is loaded with fasteners and carried by the handle.

Figure 31:
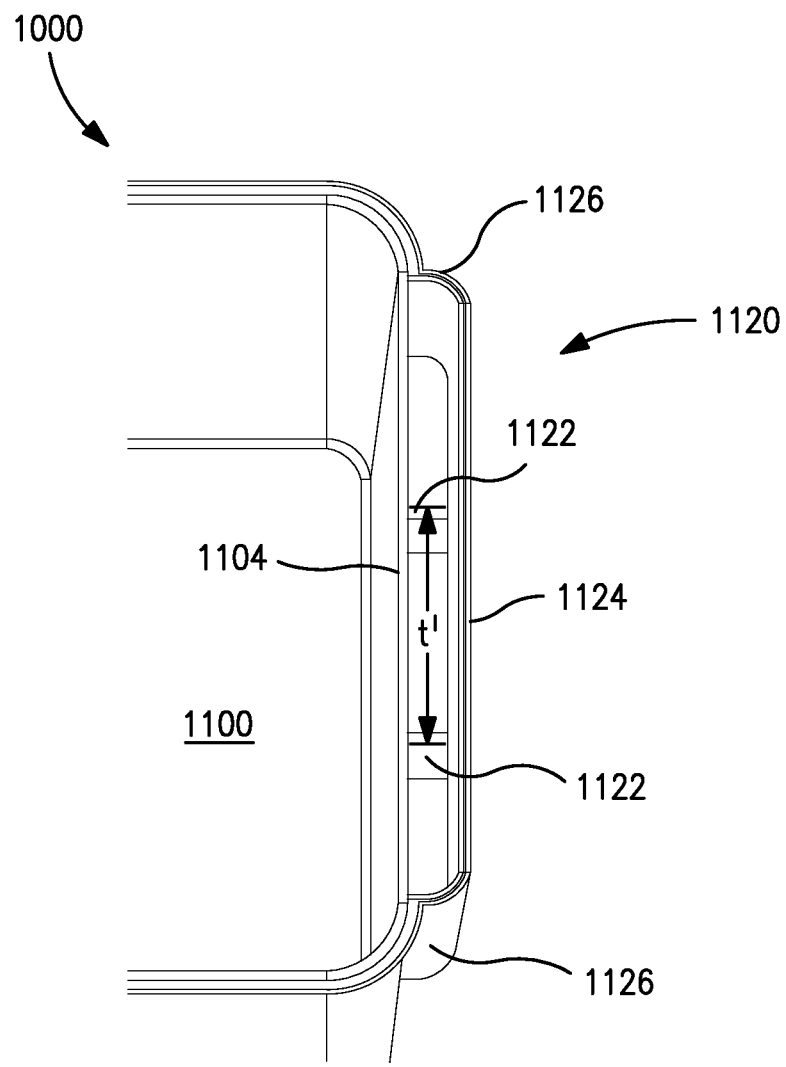
FIG. 31 is an enlarged perspective view of the container illustrated in FIG. 28, with particular emphasis on one of the pairs of peripheral sleeves and corresponding vertical reinforcement struts of the container.
Figure 32:
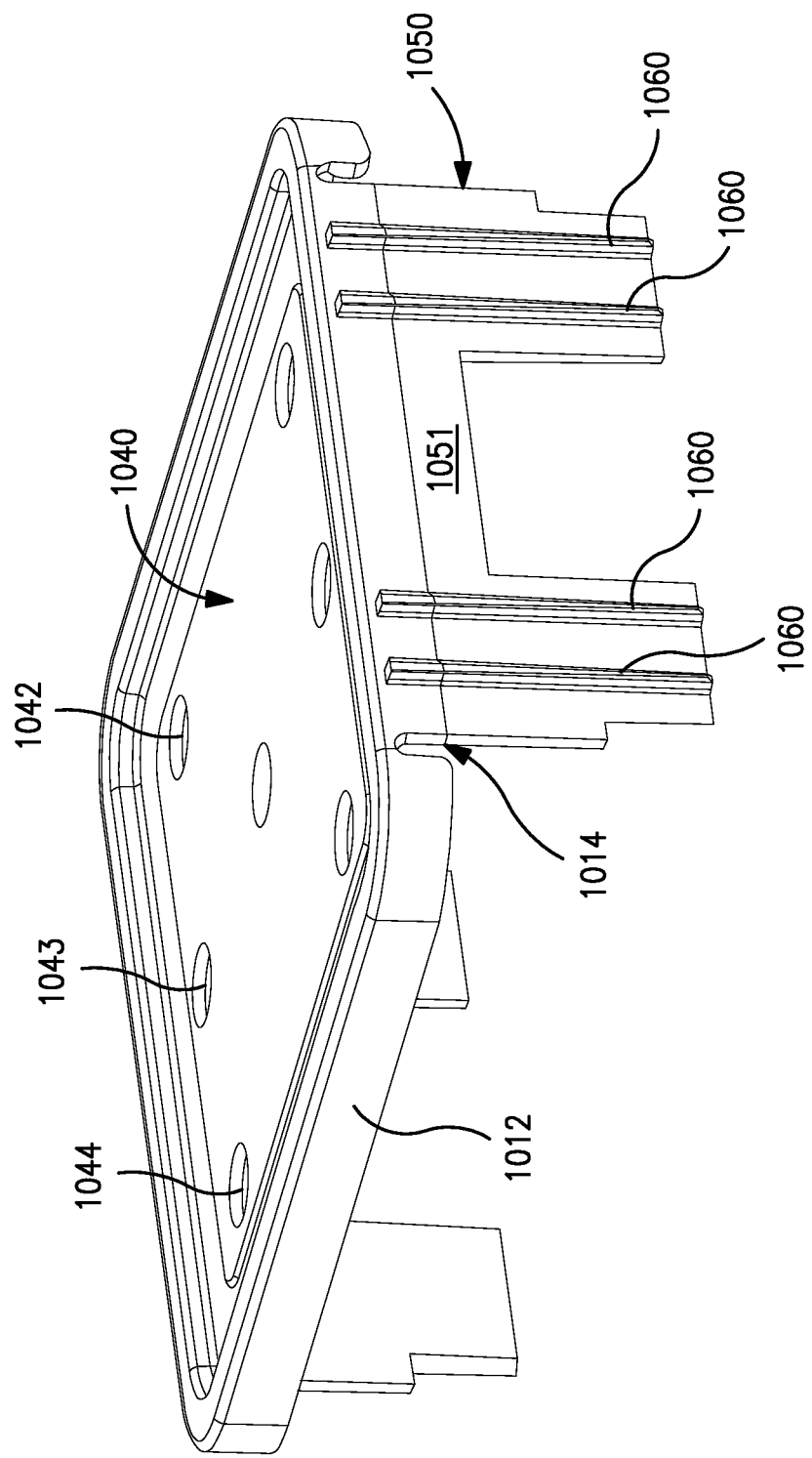
FIG. 32 is a perspective view of an alternate embodiment of the fastener alignment guide illustrated in FIGS. 23-27.
Figure 33:
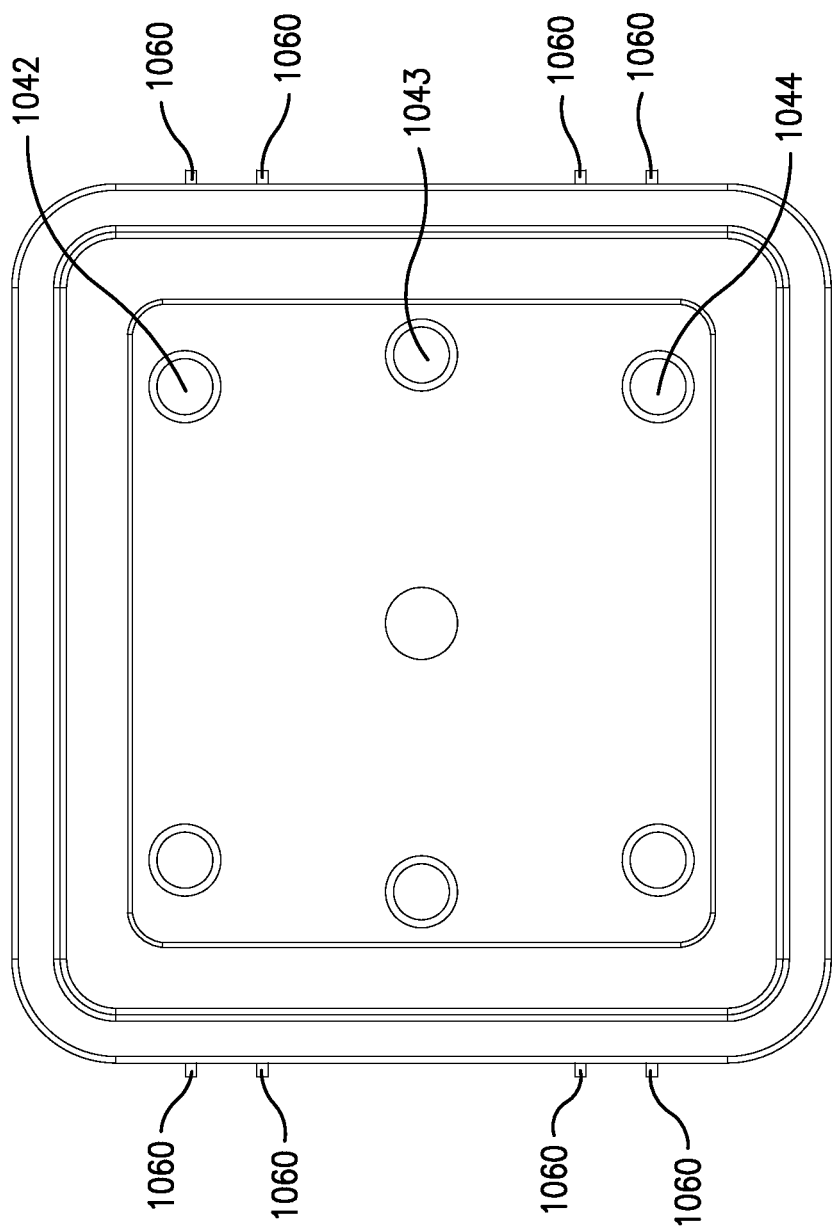
FIG. 33 is a top plan view of the fastener alignment guide of FIG. 32.

The lid/fastener alignment guide 1010 is configured to reversibly mate with the container 1000. As shown in FIGS. 24, 26, and 27, the lid/fastener alignment guide 1010 has a peripheral lip 1012. The peripheral lip defines a pair of lip notches 1014 corresponding to a pair of lateral terminal walls 1126 of the sleeve 1120 (FIGS. 28, 29, and 31). The peripheral lip 1012 flexes at each lip notch 1014, engages the container lip 1106, and is received in the peripheral sleeve 1120 (FIG. 23).

With reference to FIGS. 32-37, an alternate embodiment of the fastener alignment guide of FIGS. 23-31 is illustrated. As best seen in FIGS. 32, 33, 35 and 36, a plurality of spacers 1060 project perpendicularly from an exterior surface 1051 of the wings 1050 and extend perpendicularly away from the template 1040. In one embodiment, two pairs of spacers 1060 are disposed on either side of the rectangular recess 1052 of each wing 1050.

Figure 34:
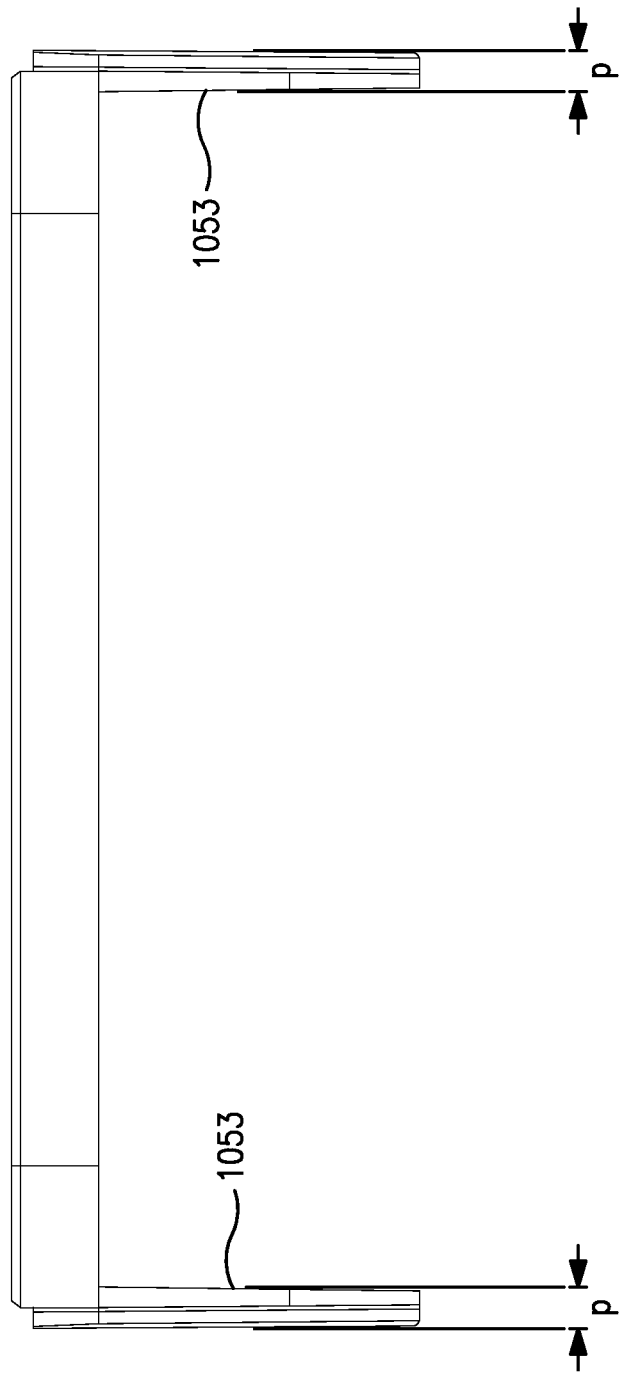
FIG. 34 is a side view of the fastener alignment guide of FIG. 32.
Figure 35:
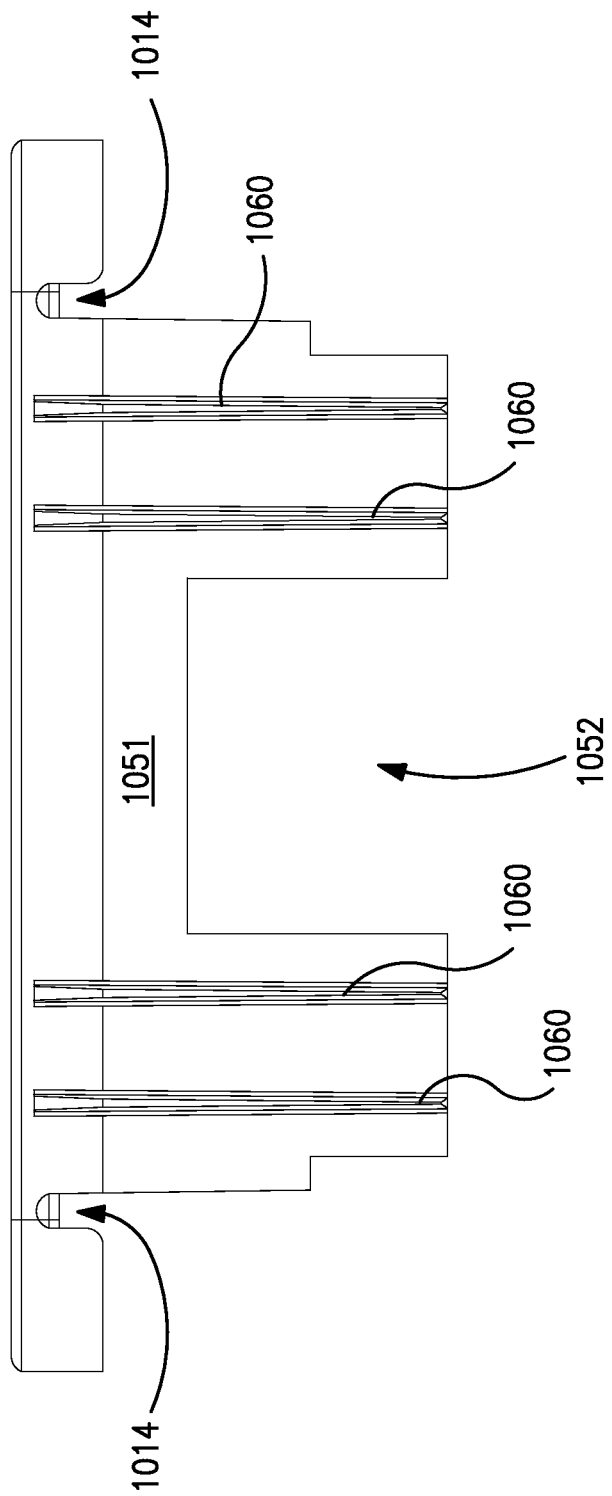
FIG. 35 is a side view of the fastener alignment guide of FIG. 32, with particular emphasis on the wings.
Figure 36:
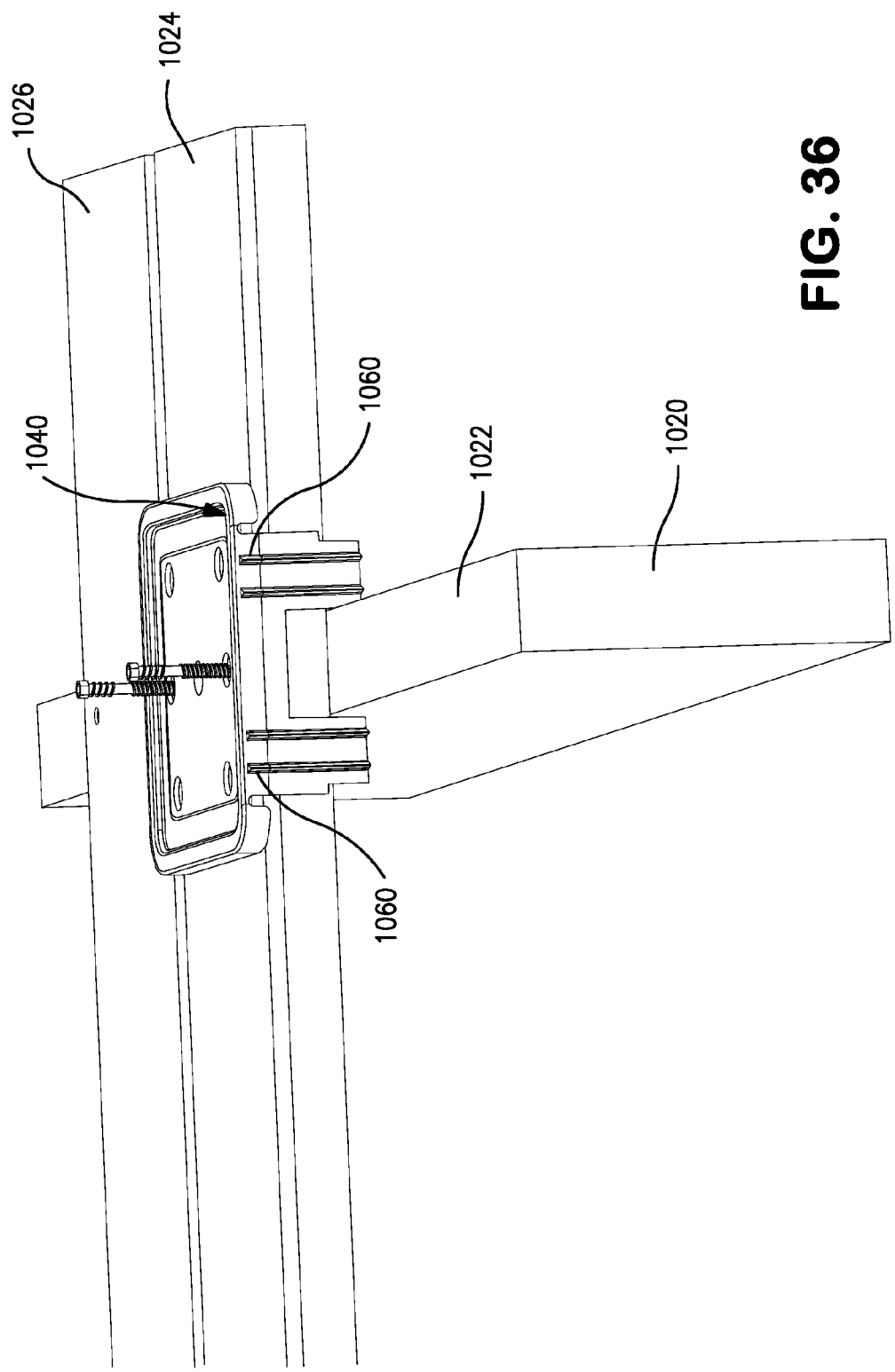
FIG. 36 is a perspective view of the fastener alignment guide of FIG. 32 as employed for constructing a deck.
Figure 37:
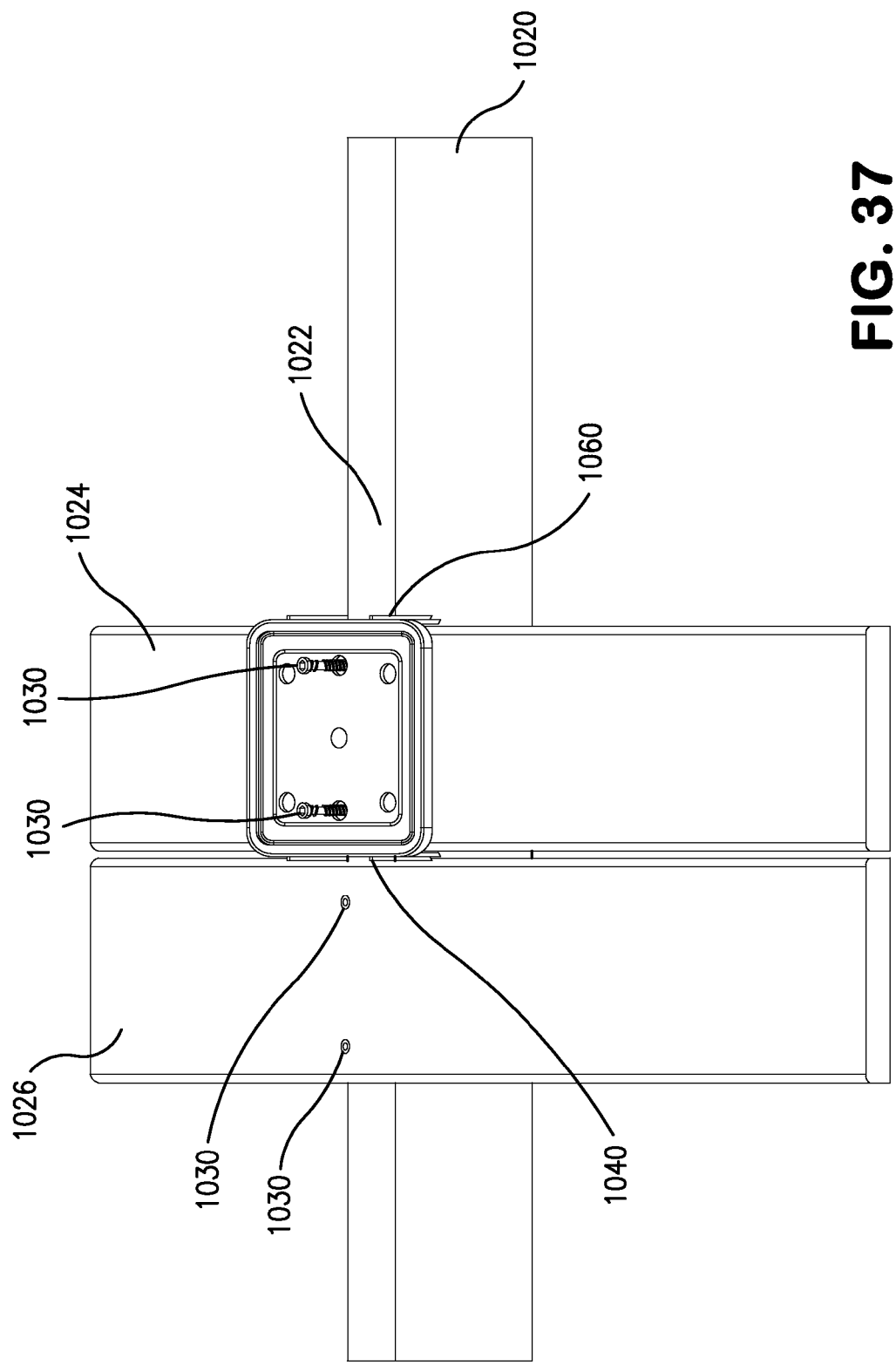
FIG. 37 is a top plan view of the fastener alignment guide of FIG. 32 as employed for constructing a deck.

Referring to FIGS. 34, 36 and 37, each of the wings 1050 has a thickness p which may vary dependent upon the type of lumber used to construct the deck. P is measured between an interior surface 1053 of each wing 1050 and a lateral most extent of the spacers 1060. In one embodiment intended for use with pressure treated deck boards, the thickness p is selected from a range between approximately 1/16" and 1/8". In another embodiment intended for use with composite deck boards, the thickness p is selected from a range between approximately 3/16" and approximately 1/4".

Figure 38:
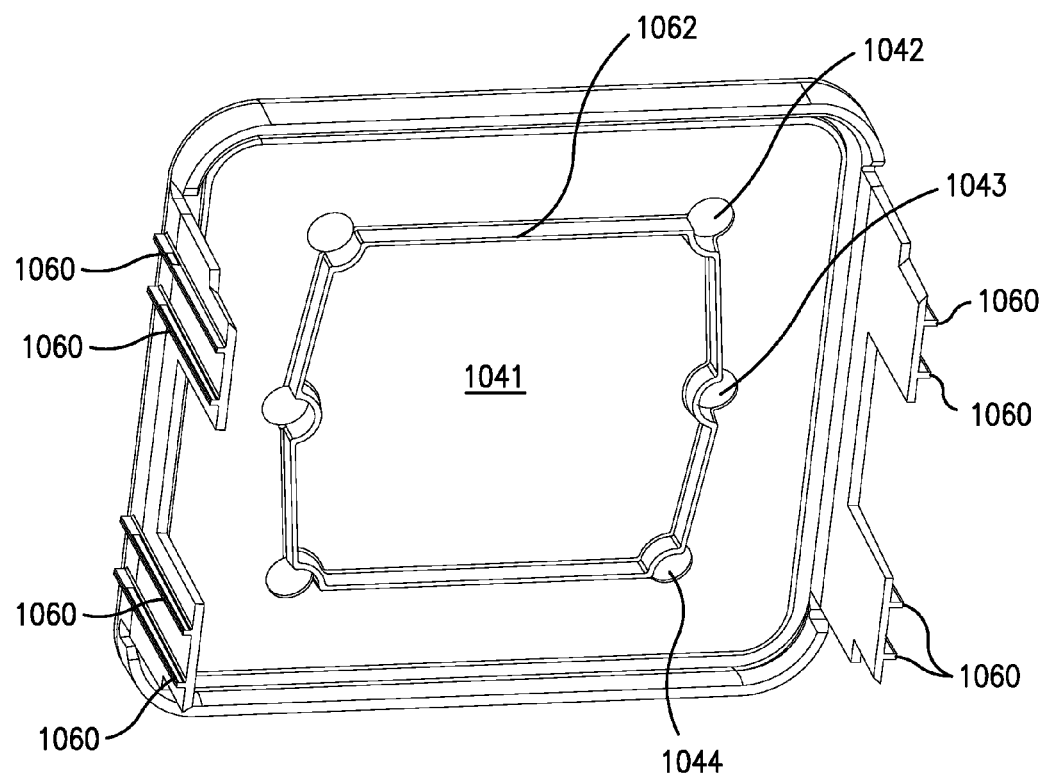
FIG. 38 is a perspective view of a bottom surface of an alternate embodiment of the fastener alignment guide depicted in FIGS. 23-27 and 32-35.

In an embodiment shown in FIG. 38, a template support member 1062 projects perpendicularly from a bottom surface 1041 of the template 1040. The support member 1062 provides rigidity to the template 1040, and prevents the template 1040 from torsionally warping and deforming. The support member shown in FIG. 38 projects from the bottom surface 1041 to form a generally hexagonal shape, though other configurations may be utilized that provide optimal structural support and resistance against warping.

As shown in FIG. 38, the structural support member 1062 may partially surround each of the openings 1042, 1043, and 1044. This configuration ensures that debris does not build up in the openings 1042, 1043, and 1044 when fasteners are driven through the deck boards 1024 and 1026 into joists 1020 (see FIGS. 36 and 37).

While preferred embodiments have been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

The invention claimed is:

1. A fastener storage assembly comprises:
   a container having a bottom and first and second opposed pairs of sidewalls extending generally perpendicularly from said bottom;
   a lid comprising a fastener alignment guide for locating a fastener to be driven through a deck board having a width w into a joist having an engagement edge face thickness t and comprising a template defining a pair of aligned openings each having a center and a medial axis passing through each center, and a pair of aligned substantially identical wings projecting perpendicular to said template and being equidistantly spaced at a distance w, each said wing defining a recess defined by a pair of parallel edges spaced a distance t and being perpendicular to a reference edge of said wing extending a distance t, said recess dimensioned to closely receive at least a portion of said joist so that opposed sides of said joist are engaged by said parallel edges, wherein a plane through the medial axis and perpendicular to said template is equidistantly spaced from said edges and wherein said alignment guide further comprises a circumferential lip traversing said template and adapted to resiliently engage the top of a bucket.

2. The fastener storage assembly of claim 1, wherein the template and wings are symmetric relative to said plane.

3. The fastener storage assembly of claim 1, wherein said template is generally rectangular.

4. The fastener storage assembly of claim 1, wherein said wings have a thickness selected from a range between approximately 1/16 inch and approximately 1/8 inch.

5. The fastener storage assembly of claim 1, wherein said wings have a thickness selected from a range between approximately 3/16 inch and approximately 1/4 inch.

6. The fastener storage assembly of claim 1 and a fastener having a head wherein each said opening has a substantially equal diametral dimension and wherein said head is adapted to pass through each said opening.

7. A fastener storage assembly comprising:
   a lid having a fastener alignment guide for locating a fastener to be driven through a deck board having a width w into a joist having an engagement edge face thickness t, the fastener alignment guide comprising a template defining a plurality of openings, a pair of aligned substantially identical wings projecting perpendicular to said template and being equidistantly spaced a distance w, each said wing defining a recess defined by a pair of parallel edges spaced a distance t, and a peripheral lid engagement lip;
   a container comprising a bottom, first and second opposed pairs of sidewalls extending perpendicularly from said bottom and terminating axially opposite said bottom in a peripheral container lip, a sleeve peripherally projecting from an exterior surface of each of said first pair of opposed sidewalls, each of said sleeves having a peripheral wall, and a pair of lateral terminal walls;
   wherein said peripheral lid engagement lip defines a plurality of notches configured to cooperate with said lateral terminal walls of said sleeve such that said peripheral lid engagement lip is received in said sleeve reversibly mating said peripheral lid engagement lip with said peripheral container lip.

8. The fastener storage assembly of claim 7, wherein each of said sidewalls of said first opposed pair of sidewalls has a pair of structural support ribs integral with and extending perpendicularly away from said first opposed pairs of sidewalls and said bottom.

9. The fastener storage assembly of claim 8, wherein said structural support ribs define substantially identical pairs of recessed cavities adjacent said peripheral container lip having a generally v-shaped sidewall extending vertically from and perpendicularly to a cavity bottom.

10. The fastener storage assembly of claim 9, wherein said pairs of recessed cavities form a bit holder cavity configured to receive a drive-bit.

11. The fastener storage assembly of claim 7, wherein said template has a central medial axis, and defines a plurality of pairs of laterally opposed openings, each opening has a center, said openings of each of said pairs is defined at a point equidistantly spaced form said central medial axis, and each pair of said laterally opposed openings lying on a separate lateral axis, each lateral axis oriented perpendicular to said central medial axis and passing through both centers of said opposed pair of laterally opposed openings, and wherein said pairs of laterally opposed openings are positioned on said template such that an opening on one lateral axis is aligned at an angle θ with an opening on an opposite side of said central medial axis and lying on a separate lateral axis, said angle θ measured with respect to said lateral axes.

12. The fastener storage assembly of claim 7, wherein said second pair of opposed walls have a width at a point adjacent said peripheral container lip equal to said distance w between said pair of aligned substantially identical wings.

13. The fastener storage assembly of claim 7, wherein said container has a plurality of vertical reinforcement struts integral with and extending perpendicularly between said sidewalls and said peripheral wall.

14. The fastener storage assembly of claim 13, wherein said vertical structural support struts of the peripheral sleeve are separated from one another by a distance equal to said distance t between said pair of parallel edges.

15. The fastener storage assembly of claim 13, wherein said vertical structural support struts are recessed from said peripheral container lip a distance r corresponding to a distance between a top of said recess of said wings and an underside of said template.

16. The fastener storage assembly of claim 7, wherein a plurality of spacers project generally perpendicularly from an exterior surface of each of said wings and extend generally perpendicularly away from said template, and wherein each of said wings has a thickness p measured between an interior surface of each of said wings and a lateral most extent of said spacers.

17. The fastener storage assembly of claim 16, wherein said spacers are disposed on either side of said recess.

18. The fastener storage assembly of claim 16, wherein p is selected from a range between approximately 3/16 inch and approximately 1/4 inch.

19. The fastener storage assembly of claim 16, wherein p is selected from a range between approximately 1/16 inch and approximately 1/8 inch.

20. The fastener storage assembly of claim 7, wherein a template support member projects generally perpendicularly away from a bottom surface of said template.

21. The fastener storage assembly of claim 20, wherein said structural support member partially surrounds each of said openings such that debris does not build up in each of said openings when the fastener is driven through the deck board and joist.

* * * * *